(12) United States Patent
Donnelly

(10) Patent No.: US 11,841,709 B2
(45) Date of Patent: *Dec. 12, 2023

(54) AUTONOMOUS VEHICLE COMPATIBLE ROBOT

(71) Applicant: UATC, LLC, Mountain View, CA (US)

(72) Inventor: Richard Brian Donnelly, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,810

(22) Filed: Apr. 12, 2022

(65) Prior Publication Data

US 2022/0236738 A1    Jul. 28, 2022

Related U.S. Application Data

(63) Continuation of application No. 16/173,392, filed on Oct. 29, 2018, now Pat. No. 11,340,625.

(Continued)

(51) Int. Cl.
*G06Q 20/18* (2012.01)
*G06Q 10/083* (2023.01)
(Continued)

(52) U.S. Cl.
CPC ......... *G05D 1/0225* (2013.01); *G05D 1/0088* (2013.01); *G05D 1/0238* (2013.01);
(Continued)

(58) Field of Classification Search
CPC .. B60H 1/007; B60H 1/00271; G05D 1/0027; G05D 1/0676; G05D 1/0088;
(Continued)

(56) References Cited

U.S. PATENT DOCUMENTS 1,758,826 A    5/1930   Dellert
1,911,224 A    5/1933   Dellert
(Continued)

FOREIGN PATENT DOCUMENTS

CN    203623483    6/2014
CN    105189313    12/2015
(Continued)

*Primary Examiner* — Yuri Kan
(74) *Attorney, Agent, or Firm* — Dority & Manning, P.A.

(57) ABSTRACT

An autonomous robot is provided. In one example embodiment, an autonomous robot can include a main body including one or more compartments. The one or more compartments can be configured to provide support for transporting an item. The autonomous robot can include a mobility assembly affixed to the main body and a sensor configured to obtain sensor data associated with a surrounding environment of the autonomous robot. The autonomous robot can include a computing system configured to plan a motion of the autonomous robot based at least in part on the sensor data. The computing system can be operably connected to the mobility assembly for controlling a motion of the autonomous robot. The autonomous robot can include a coupling assembly configured to temporarily secure the autonomous robot to an autonomous vehicle. The autonomous robot can include a power system and a ventilation system that can interface with the autonomous vehicle.

20 Claims, 9 Drawing Sheets

Related U.S. Application Data

(60) Provisional application No. 62/716,063, filed on Aug. 8, 2018.

(51) Int. Cl.
*B25J 9/08* (2006.01)
*G05D 1/02* (2020.01)
*G05D 1/00* (2006.01)

(52) U.S. Cl.
CPC ... *G05D 1/0246* (2013.01); *G05D 2201/0213* (2013.01); *G05D 2201/0216* (2013.01)

(58) Field of Classification Search
CPC .... G05D 1/0291; G05D 1/0238; B64D 13/08; B64D 11/04; B62B 3/004; G07F 11/62; G07C 9/00571; G06K 9/00201; B25J 9/0009; F25D 3/125; B53C 39/024; B60K 1/00; G06W 30/0265; B35J 9/08
See application file for complete search history.

(56) References Cited

U.S. PATENT DOCUMENTS

| | | | |
|---|---|---|---|
| 2,132,279 A | 10/1938 | Wicknick et al. | |
| 2,563,347 A | 8/1951 | Long | |
| 2,642,119 A | 6/1953 | Dary | |
| 3,463,539 A | 8/1969 | Racine et al. | |
| 3,632,161 A | 1/1972 | Arfaras et al. | |
| 3,637,253 A | 1/1972 | Maule et al. | |
| 3,866,435 A * | 2/1975 | Frank | F25D 17/04 62/382 |
| 5,653,262 A | 8/1997 | Hanemaayer | |
| 5,738,408 A | 4/1998 | Wu | |
| 6,030,037 A | 2/2000 | Ritch et al. | |
| 6,264,261 B1 | 7/2001 | Krafcik | |
| 6,338,518 B1 | 1/2002 | D'Annunzio et al. | |
| 6,350,972 B1 | 2/2002 | Wright et al. | |
| 6,540,279 B1 | 3/2003 | Bargiel | |
| 6,925,679 B2 | 8/2005 | Wallach et al. | |
| 7,066,519 B2 | 6/2006 | Rhodes et al. | |
| 7,090,274 B1 | 8/2006 | Khan et al. | |
| 7,156,442 B2 | 1/2007 | McManus et al. | |
| 8,010,230 B2 | 8/2011 | Zini et al. | |
| 8,182,016 B2 | 5/2012 | Kaip et al. | |
| 8,186,735 B2 | 5/2012 | Maceri et al. | |
| 9,256,852 B1 | 2/2016 | Myllymaki | |
| 9,510,682 B2 | 12/2016 | Hasegawa et al. | |
| 9,533,625 B2 | 1/2017 | Krishnan et al. | |
| 10,308,430 B1 * | 6/2019 | Brady | G05D 1/0027 |
| 10,310,500 B1 * | 6/2019 | Brady | G07C 9/00571 |
| 10,890,921 B2 | 1/2021 | Gillett | |
| 11,340,625 B2 * | 5/2022 | Donnelly | B60H 1/00271 |
| 2005/0028543 A1 | 2/2005 | Whitehead et al. | |
| 2007/0156540 A1 | 7/2007 | Koren et al. | |
| 2008/0185893 A1 | 8/2008 | Behrens et al. | |
| 2010/0052374 A1 | 3/2010 | Bell et al. | |
| 2011/0010007 A1 * | 1/2011 | Sarh | B25J 9/08 700/248 |
| 2013/0292102 A1 * | 11/2013 | Trumper | B64D 13/08 165/168 |
| 2015/0006005 A1 | 1/2015 | Yu et al. | |
| 2015/0059363 A1 * | 3/2015 | Burd | B62B 3/004 62/3.62 |
| 2015/0202770 A1 * | 7/2015 | Patron | G06Q 20/386 700/245 |
| 2015/0289643 A1 * | 10/2015 | Holtorf | B64D 11/04 62/98 |
| 2015/0379468 A1 | 12/2015 | Danaher | |
| 2016/0280095 A1 | 9/2016 | Frye et al. | |
| 2017/0354996 A1 | 2/2017 | Lim et al. | |
| 2017/0166173 A1 | 6/2017 | Lauffer et al. | |
| 2017/0355295 A1 * | 12/2017 | Gutowitz | B60K 1/00 |
| 2018/0079278 A1 | 3/2018 | Kirpichnikov et al. | |
| 2019/0051083 A1 * | 2/2019 | Goldberg | G07F 11/62 |
| 2019/0056751 A1 * | 2/2019 | Ferguson | G06K 9/00201 |
| 2019/0329978 A1 * | 10/2019 | Li | G05D 1/0295 |
| 2020/0051001 A1 * | 2/2020 | Donnelly | G06Q 10/02 |
| 2020/0207474 A1 * | 7/2020 | Foggia | G05D 1/0676 |
| 2021/0132625 A1 | 5/2021 | Gillett | |

FOREIGN PATENT DOCUMENTS

| | | | |
|---|---|---|---|
| CN | 108284446 A * | 7/2018 | ............ B25J 9/0009 |
| DE | 4200476 | 7/1993 | |
| DE | 19822694 | 11/1999 | |
| DE | 102010055365 | 7/2011 | |
| EP | 1247473 | 10/2002 | |
| EP | 2258579 | 8/2010 | |
| FR | 2920011 | 2/2009 | |
| JP | 6270307 | 12/2013 | |
| JP | 6262937 | 1/2014 | |
| KR | 100783510 | 6/2007 | |
| WO | WO2012060462 | 5/2012 | |
| WO | WO2017156586 | 9/2017 | |

* cited by examiner

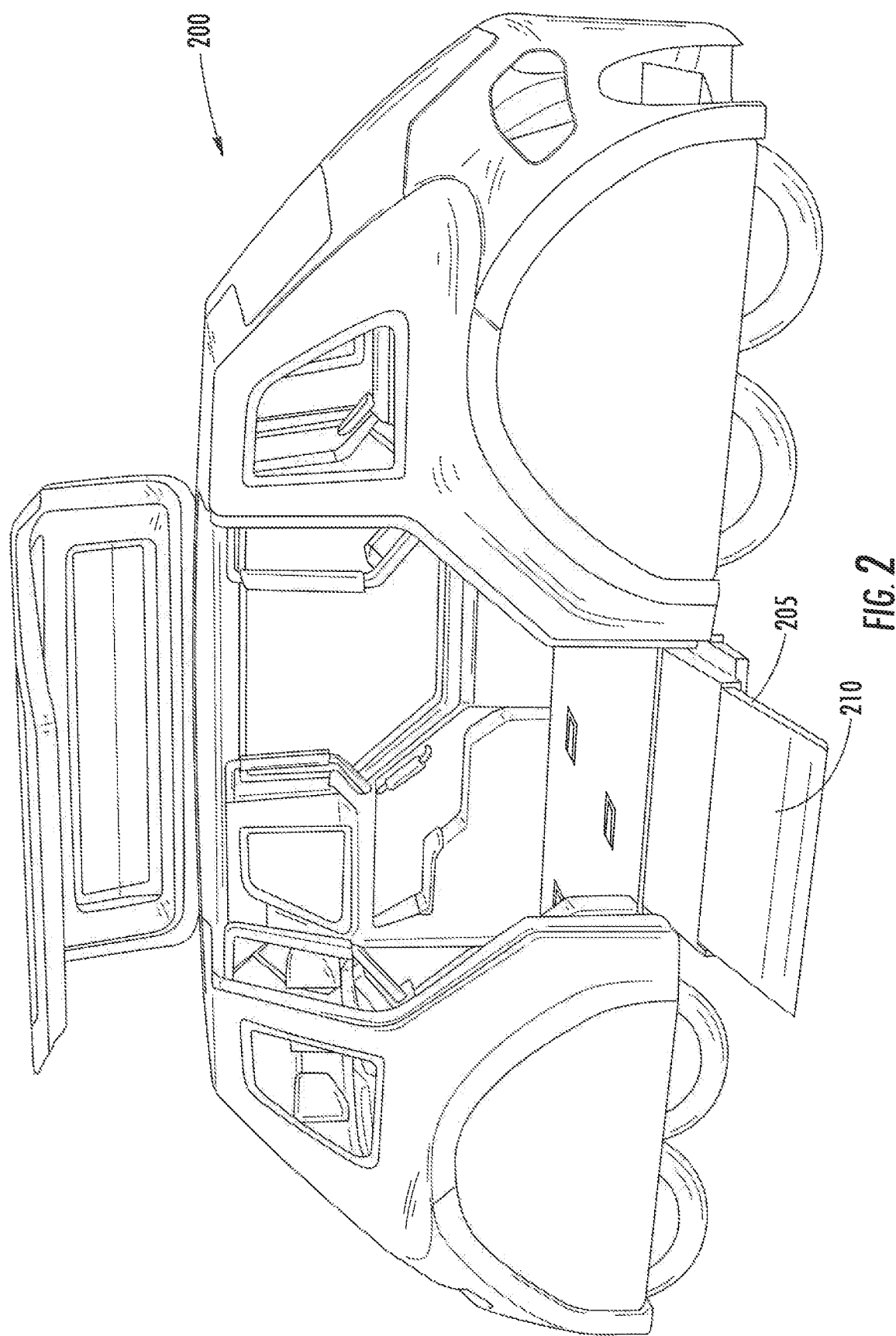

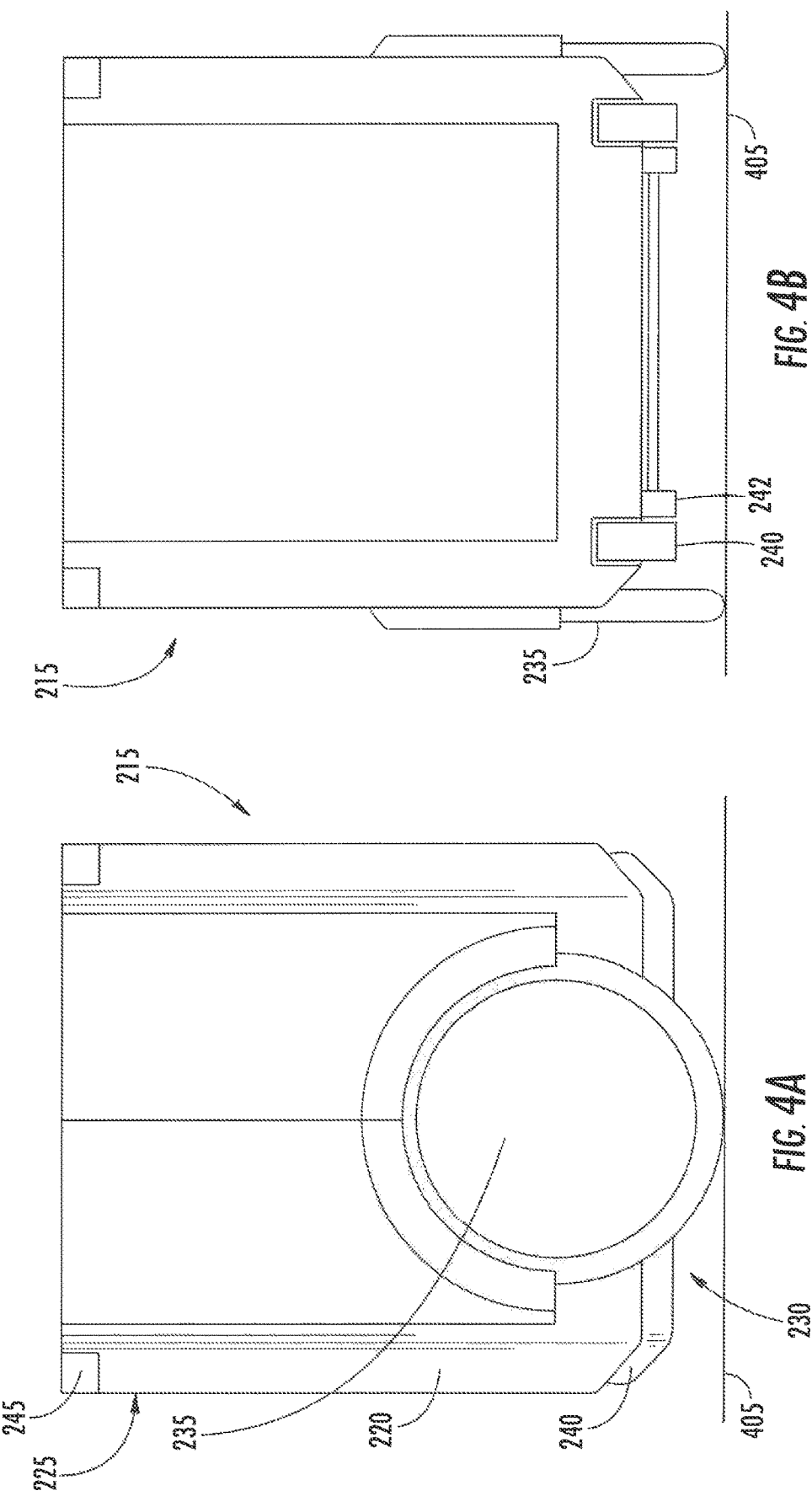

AUTONOMOUS VEHICLE COMPATIBLE ROBOT

PRIORITY CLAIM

The present application is a continuation of U.S. application Ser. No. 16/173,392 having a filing date of Oct. 29, 2018, which claims the benefit of U.S. Provisional Application 62/716,063 having a filing date of Aug. 8, 2018. Applicant claims priority to and the benefit of each of such applications and incorporate all such applications herein by reference in its entirety.

FIELD

The present disclosure relates generally to an autonomous robot that can interface with an autonomous vehicle.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to an autonomous robot. The autonomous robot includes a main body including one or more compartments. The one or more compartments are configured to provide support for transporting an item. The autonomous robot includes a mobility assembly affixed to the main body. The autonomous robot includes a sensor configured to obtain sensor data associated with a surrounding environment of the autonomous robot. The autonomous robot includes a computing system operable with the sensor for obtaining the sensor data. The computing system is configured to plan a motion of the autonomous robot based at least in part on the sensor data. The computing system is further operably connected to the mobility assembly for controlling a motion of the autonomous robot. The autonomous robot includes a coupling assembly configured to temporarily secure the autonomous robot to an autonomous vehicle. The autonomous robot includes a power system operable with the at least one of the computing system or the mobility assembly. The power system includes a power interface for interfacing with the autonomous vehicle to obtain a power resource from the autonomous vehicle or provide the power resource to the autonomous vehicle or both. The autonomous robot includes a ventilation system configured to provide ventilation for the autonomous robot. The ventilation system includes a ventilation interface for interfacing with the autonomous vehicle.

Another example aspect of the present disclosure is directed to a computer-implemented method. The method includes obtaining, by a computing system of an autonomous robot that includes one or more computing devices, location data indicative of a location associated with an autonomous vehicle. The method includes causing, by the computing system, the autonomous robot to initiate a motion control to travel to the location of the autonomous vehicle based at least in part on the location data and to board the autonomous vehicle. The method includes determining, by the computing system, a position within the autonomous vehicle for the autonomous robot. The method includes controlling, by the computing system, a coupling assembly of the autonomous robot to secure the autonomous robot to the autonomous vehicle at the position within the autonomous vehicle. The method includes controlling, by the computing system, the autonomous robot to connect one or more systems of the autonomous robot to the autonomous vehicle. The one or more systems of the autonomous robot include a power system and a ventilation system.

Yet another example aspect of the present disclosure is directed to an autonomous vehicle assembly. The autonomous vehicle assembly includes an autonomous vehicle. The autonomous vehicle includes one or more first sensors configured to obtain first sensor data associated with a surrounding environment of the autonomous vehicle. The autonomous vehicle includes a first computing system operable with the one or more first sensors for receiving the first sensor data. The first computing system is configured to plan a motion of the autonomous vehicle. The autonomous vehicle includes a first power system comprising a power source for the autonomous vehicle. The autonomous vehicle includes a first ventilation system configured to provide ventilation for the autonomous vehicle. The autonomous vehicle assembly includes an autonomous robot positioned onboard the autonomous vehicle. The autonomous robot includes a main body including one or more compartments. The one or more compartments are configured to provide support for transporting an item. The autonomous robot includes a mobility assembly affixed to the main body. The autonomous robot includes one or more second sensors configured to obtain second sensor data associated with a surrounding environment of the autonomous robot. The autonomous robot includes a second computing system operable with the one or more second sensors for receiving the second sensor data. The computing system is configured to plan a motion of the autonomous robot based at least in part on the second sensor data. The computing system is further operably connected to the mobility assembly for controlling a motion of the autonomous robot. The autonomous robot includes a coupling assembly configured to secure the autonomous robot to the autonomous vehicle. The autonomous robot includes a second power system that is connected with the first power system of the autonomous vehicle. The autonomous robot includes a second ventilation system configured to provide ventilation for the autonomous robot. The second ventilation system is connected with the first ventilation system of the autonomous vehicle.

Other example aspects of the present disclosure are directed to systems, methods, vehicles, apparatuses, tangible, non-transitory computer-readable media, and memory devices for controlling an autonomous robot and the infrastructure of an autonomous robot.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 2 depicts an example autonomous vehicle according to example embodiments of the present disclosure;

FIGS. 4A-B depict example portions of an autonomous robot according to example embodiments of the present disclosure;

DETAILED DESCRIPTION

Figure 1:
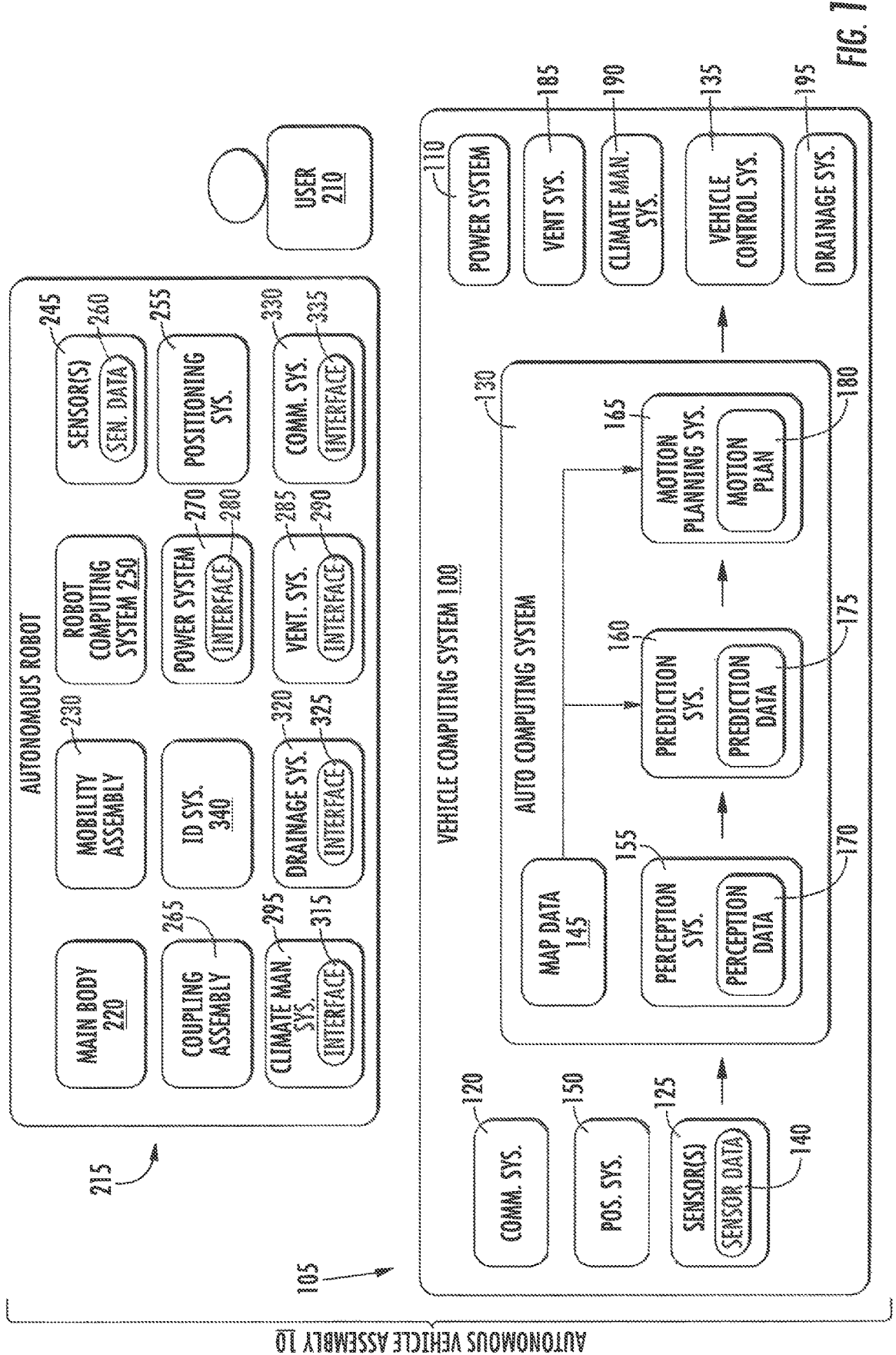
FIG. 1 depicts an example autonomous vehicle assembly according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an autonomous robot that interfaces with an autonomous vehicle to leverage the resources of the autonomous vehicle. For instance, an autonomous vehicle can be utilized to perform one or more vehicle services such as, for example, transportation services (e.g., rideshare services), courier services, delivery services, etc. To help reduce the cost of such services, a user may choose to pool the requested services with other users (e.g., users riding together to different destination locations). In some cases, users may prefer to utilize an autonomous vehicle without the presence of another user but wish to achieve a similar level of cost savings as afforded by service pooling.

Embodiments of the present disclosure allow for such an opportunity by providing an autonomous robot that is configured to board and ride within an autonomous vehicle (e.g., with a user). The autonomous robot can be configured provide a service such as, for example, the transportation of various items (e.g., food for delivery, toiletries for sale, tools for rent, etc.). Moreover, while the autonomous robot is independently mobile from the autonomous vehicle, it can be configured to interface with the autonomous vehicle to utilize the vehicle's resources. For instance, the autonomous robot can include a main body (e.g., including compartment(s) for transporting item(s)), a mobility assembly (e.g., wheels, tracks, etc.), sensor(s) to help perceive the vehicle's surrounding environment, and a computing system for autonomously navigating the robot through its surroundings. The robot can include a coupling assembly (e.g., pins, magnets, etc.) configured to temporarily secure the autonomous robot to an autonomous vehicle (e.g., at a designated position within of the vehicle). The autonomous robot can include one or more systems that interface with the autonomous vehicle. For instance, the autonomous robot can include a power system, a ventilation system, a climate management system, a drainage system, a communication system, etc. that interface with the autonomous vehicle to utilize the corresponding systems of the autonomous vehicle (e.g., use the vehicle's power resources, the vehicle's HVAC system, the vehicle's communication system, etc.). In this way, the onboard infrastructure of the autonomous robot can remain limited by allowing the autonomous robot to leverage the resources of the autonomous vehicle (when it is docked thereto). Such efficiency allows the autonomous robot to remain smaller in stature and, thus, be less intrusive to a user that is also travelling within the autonomous vehicle.

An autonomous vehicle (e.g., a ground-based autonomous car, etc.) can include various systems and devices configured to control the operation of the vehicle. For example, an autonomous vehicle can include an onboard vehicle computing system (e.g., located on or within the autonomous vehicle) for operating the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the autonomous vehicle to communicate with one or more computing systems that are remote from the vehicle. The autonomous vehicle can include other types of systems such as, for example, a power system that provides power resources (e.g., electrical power, fuel, etc.), a ventilation system that provides ventilation from the vehicle, a climate management system that controls the thermal conditions of the vehicle (e.g., for heating and cooling), a drainage system that allows fluid to drain from the vehicle, etc.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. For example, a service entity can offer vehicle service(s) to users via a software application (e.g., on a user computing device, etc.), via a website, and/or via other types of user interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

In addition to transporting users, an autonomous vehicle can be configured to transport one or more autonomous robots. For instance, the autonomous vehicle can transport an autonomous robot concurrently with a user in order to pool its transportation services and, thus, decreasing the cost to the user. The autonomous robot can be, for example, a ground-travel based autonomous robot. In some implementations, the autonomous vehicle can include one or more designated positions within the autonomous vehicle for an autonomous robot. A designated position can include, for example, a designated area within a grid-like floor pattern in the interior of the vehicle's cabin. The autonomous robot can be positioned at one of these designated portions when the autonomous robot is onboard the autonomous vehicle, as further described herein.

The autonomous robot can be configured to perform one or more services. For example, the autonomous robot can be utilized for transporting one or more items. The items can include, for example, food, electronics, toiletries, tools, construction materials, reading material, flowers, toys, medicine, perishable items, non-perishable items, and/or any other items. The items can include items intended to be delivered to a user and/or entity (e.g., ordered by a user onboard the autonomous vehicle, based on the transportation of the autonomous robot via the autonomous vehicle, etc.), items available for purchase (e.g., by a user of the corresponding autonomous vehicle, by a user at a destination location, etc.), items available for rent (e.g., by a user of the corresponding autonomous vehicle, by a user at a destination location, etc.), and/or other types of items.

The autonomous robot can be associated with a variety of parties. For instance, in some implementations, an autonomous robot can be associated with a service entity. This can be the same service entity for which the autonomous vehicle is providing vehicle service(s). The service entity can allow a third party to use, lease, rent, etc. the autonomous robot to transport items associated with the third party. In some implementations, the autonomous robot can be associated with a user of the autonomous vehicle. For example, the user can utilize the autonomous robot to transport items for the user and/or delivery items to the user while the user is riding in the autonomous vehicle. In some implementations, the autonomous robot can be associated with a third party. The third party can include, for example, a retailer, a service provider, a shipper, and/or other types of entities. The third party can utilize the autonomous robot to transport items, as described herein.

The autonomous robot can include an infrastructure that allows it to transport items, autonomously travel, and integrate with the system(s) of an autonomous vehicle. For instance, the autonomous robot can include means for transporting an item. The autonomous robot can include a main body (with a frame) that includes one or more compartments. Each of the compartments can be configured to provide support for transporting one or more item(s). The compartment(s) can be different sizes, shapes, etc. and/or can be configured to transport different items (e.g., cold food in one compartment, hot food in another compartment, etc.). The compartment(s) can be physically separated from the other compartment(s). In some implementations, the compartment(s) can be thermally separated from the other compartment(s) such that the compartment(s) can have different thermal conditions (e.g., temperature, humidity, etc.). In some implementations, the compartment(s) can include a lock (e.g., mechanical lock, magnetic lock, electronic lock, etc.). The lock can be adjusted between a locked state and an unlocked state to secure items while in transport and to allow for retrieval by an authorized user.

The autonomous robot can also include means for allowing the autonomous robot to move along a ground surface, into an autonomous vehicle, etc. For instance, the autonomous robot can include a mobility assembly affixed to the main body. The mobility assembly can include, for example, two or more wheels (e.g., self-balancing wheel assembly, etc.), tracks, and/or other mechanism(s) for allowing the autonomous robot to traverse a surface. The mobility assembly can be connected to a powertrain and/or other type of drive mechanism that is configured help start, maintain, reduce, etc. the motion of the mobility assembly.

The autonomous robot can include means for autonomously controlling the motion of the autonomous robot. For instance, the autonomous robot can include one or more sensors, a computing system, and a positioning system. The sensor(s) can be configured to obtain sensor data associated with a surrounding environment of the autonomous robot. The sensor(s) can include, for example, cameras (e.g., mono cameras, infrared cameras, stereo cameras, etc.), Light Detection and Ranging (LIDAR) systems, Range Detection and Ranging (RADAR) systems, and/or other types of sensors. The robot computing system of the autonomous robot can be operable with the sensor(s) for obtaining the sensor data (e.g., via a bus, etc.). The robot computing system (e.g., including processor(s), memory, etc.) can be configured to plan a motion of the autonomous robot based at least in part on the sensor data. For instance, the robot computing system can include an autonomy system for perceiving objects in the surrounding environment (e.g., by analyzing the sensor data), predicting future locations and/or paths associated with such objects, and generating a motion plan that navigates through the surrounding environment based on map data as well as the predicted location of surrounding objects. Control signals can be outputted to control the motion of the autonomous robot in accordance with the motion plan. For example, the robot computing system can be operably connected to the mobility assembly (a control system associated therewith) for controlling the motion of the autonomous robot (e.g., to cause the wheels, tracks, etc. to turn).

The positioning system of the autonomous robot can be configured to determine a specific location of the autonomous robot relative to a geographic coordinate system, a specific target destination location, a location of an autonomous vehicle, and/or other locations. The positioning system can determine actual or relative position by using a satellite navigation positioning system (e.g., a GPS system), an inertial navigation system, a dead reckoning system, based on IP address, by using triangulation and/or proximity to cellular towers or WiFi hotspots, and/or other suitable techniques for determining position. The positioning system can allow the autonomous robot to localize itself within its surrounding environment.

The autonomous robot can include means for securing the autonomous robot to the autonomous vehicle. For instance, the autonomous robot can include a coupling assembly configured to temporarily secure the autonomous robot to an autonomous vehicle. The coupling assembly can include one or more pins, locks, magnets, latches, hooks, etc. that can securely attach the autonomous robot to the autonomous vehicle. This can help keep the autonomous robot stationary while onboard the autonomous vehicle. In some implementations, the coupling assembly can provide an interface for transferring data and/or other resources between the autonomous robot and the autonomous vehicle.

The autonomous robot can include one or more systems that are configured to interface with the onboard system(s) of an autonomous vehicle. The power system can include a power source (e.g., a battery positioned within the frame, fuel supply, etc.) for the autonomous robot. For example, the power system can be operable with at least one of the robot computing system or the mobility assembly, to provide power to such components. The power system can include a power interface (e.g., physical connector, cable, plug, prong(s), electrical pin(s), contact surface(s), connectionless/wireless energy transfer devices, piping, etc.) for interfacing with the autonomous vehicle to obtain a power resource (e.g., electric charge, fuel, etc.) from the autonomous vehicle. In some implementations, the autonomous robot can provide its power resource(s) to the autonomous vehicle. The autonomous robot can include a ventilation system configured to provide ventilation for the autonomous robot. The ventilation system can include a ventilation interface (e.g., connection tube, pipe, and/or other fluid pathway) for interfacing with the autonomous vehicle (e.g., the ventilation system of the autonomous vehicle). The autonomous robot can include a climate management system that is configured to control one or more climate conditions (e.g., temperature, humidity, etc.) of the one or more compartments of the main body. The climate management system can include a climate management interface (e.g., electrical connection, fluid pathway, etc.) for interfacing with the climate management system of the autonomous vehicle (e.g., to draw from the vehicle's heating/cooling resources). In some implementations, the autonomous robot can include a drainage system configured to provide drainage for a fluid from the autonomous robot. The drainage system can include a drainage interface (e.g., tube, pipe, other fluid pathway, etc.) for interfacing with a drainage system of the autonomous vehicle. The autonomous robot can include a communication system configured to communicate and obtain data across one or more networks. The communication system can include a communication interface (e.g., physical connector, cable, transmitter, receiver, antenna, etc.) for interfacing (e.g., physically and/or wirelessly) with a second communication system of the autonomous vehicle. This can allow the autonomous robot to leverage the onboard communication system of the autonomous vehicle to better communicate data, obtain data (e.g., map updates, etc.), and/or perform other communication function(s).

In some implementations, the autonomous vehicle can include an identification system. The identification system can allow the autonomous robot to identify itself with respect to another computing system (e.g., of the autonomous vehicle before boarding). The identification system can include, for example, transmitters, receivers, transmitters, receivers, ports, controllers, antennas, and/or other suitable components for providing radio-frequency identification (RFID) signals, Bluetooth signals, and/or other types of identification data/data packets. In some implementations, the autonomous robot can include a visual identifier (e.g., QR code, barcode, etc.) on the autonomous robot (e.g., on the exterior of the main body). This can allow the autonomous robot to be scanned to authenticate the robot.

The autonomous robot can be configured to autonomously travel to and board an autonomous vehicle. For instance, the autonomous robot can initially travel to retrieve an item to be transported in the autonomous robot (e.g., purchasable snacks). The autonomous robot (e.g., its onboard computing system) can be configured to obtain location data indicative of a location associated with an autonomous vehicle. This location data can be obtained from a memory onboard the autonomous robot, a remote computing system (e.g., a cloud-based server system of the service entity), the autonomous vehicle, and/or another system. The location associated with the autonomous vehicle can be a current location of the autonomous vehicle, a future location of the autonomous vehicle, and/or a predetermined location at which the autonomous robot can meet the autonomous vehicle. The onboard computing system of the autonomous robot can cause the autonomous robot to initiate a motion control to travel to the location of the autonomous vehicle based at least in part on the location data and to board the autonomous vehicle. A motion control can be an operation, action, etc. that is associated with controlling the motion of the robot. For instance, the computing system can send control signals to cause the robot to autonomously travel (e.g., via the mobility assembly) to the location associated with the autonomous vehicle (e.g., a pre-determined pick-up location) and to board the autonomous vehicle (e.g., by traversing a ramp, stairs, etc. into the vehicle's cabin).

The autonomous robot can determine a position within the autonomous vehicle for the autonomous robot. For instance, the interior cabin of the autonomous vehicle (e.g., the floor, walls, ceiling, etc.) can include one or more identifiers (e.g., lights, reflective surfaces, markings, etc.) that indicate where the autonomous robot is to position itself within the autonomous vehicle. The sensor(s) of the autonomous robot can obtain sensor data indicative of these identifiers and the robot computing system can autonomously navigate the autonomous robot to the appropriate position within the autonomous vehicle (e.g., a position that provides a user with sufficient space within the vehicle). Additionally, or alternatively, the autonomous robot can obtain (e.g., from the autonomous vehicle, another remote computing system, etc.) positional data indicative of a designated position within the autonomous vehicle and determine where the autonomous robot should be positioned based at least in part on such data. For example, as described herein, the autonomous vehicle can include a grid-like floor pattern. The floor pattern can have an associated reference frame. The positional data can provide, for example, coordinate(s) associated with a position within the reference frame. The autonomous robot can utilize these coordinates (and reference frame) to travel to the designated position within the autonomous vehicle.

The autonomous robot can secure itself to the autonomous vehicle and interface with one or more of the vehicle's onboard system(s). For instance, the computing system of the autonomous robot can send control signal(s) to cause the coupling assembly to secure the autonomous robot to the autonomous vehicle at the robot's position within the vehicle's cabin. The robot computing system can control the autonomous robot to connect one or more of its systems to the autonomous vehicle (e.g., after securing to the vehicle). For instance, the autonomous robot can connect the robot's power system to the vehicle's power system (e.g., via the power interface), the robot's ventilation system to the vehicle's ventilation system (e.g., via the ventilation interface), the robot's climate management system to the vehicle's climate management system, the robot's communication system to the vehicle's communication system, etc.

In some implementations, while onboard the autonomous vehicle, the autonomous robot can provide a user access to the item(s) within the autonomous robot. For instance, the user can be a passenger that is being transported by the autonomous vehicle from one location to another as requested by the user. The autonomous robot can be located within the vehicle's cabin with the passenger, as the passenger is being transported. The autonomous robot can indicate to the user that one or more items within the autonomous robot are for rent, purchase, etc. For example, the autonomous robot can provide an audible output, a visual output (e.g., via a display device), a message to a user device of the passenger, etc. indicating the availability of item(s). In the event that the passenger desires to obtain any of the item(s) (e.g., purchase an item), the autonomous robot can allow the user access to one or more of it compartment(s) to remove the item. The passenger can, for example, complete the transaction via communication with the autonomous robot (e.g., by sending a purchase communication to the robot) and/or via a software application associated with the service entity of the autonomous vehicle. In some implementations, the autonomous robot can acknowledge the user via a motion (e.g., a bow, etc.), a visual output (e.g., a display device that says "HELLO"), an audio output (e.g., a sound that indicates "HELLO"), a message to the user (e.g., a "HELLO" message sent to a user device), etc.

The autonomous robot can be configured to disembark from the autonomous vehicle. For instance, when the autonomous vehicle reaches a destination location associated with the autonomous robot, the robot computing system can control the autonomous robot to decouple from the autonomous vehicle and to disembark from the autonomous vehicle. The robot computing system can provide control signal(s) to the coupling assembly to disengage with the autonomous vehicle. Moreover, the robot computing system can initiate a motion control to cause the autonomous robot to leave the autonomous vehicle. If needed, the robot computing system can cause the autonomous robot to autonomously travel to another location (e.g., to deliver item(s)).

The systems and methods described herein provide a number of technical effects and benefits. By providing technology for implementing autonomous robots that can not only transport themselves, but also be transported by an autonomous vehicle, embodiments of the present disclosure can advantageously achieve substantial cost savings and efficiency improvements for numerous applications including package delivery, food delivery, human transport and the like. Such advantages can be achieved at least in part by allowing the autonomous robots to be transported within an autonomous vehicle (e.g., with a passenger). The autonomous robots can be picked-up and dropped-off at locations that are designed to limit the effects on the passenger(s) and the autonomous vehicle (e.g., to avoid vehicle re-routing), while also reducing passenger transportation costs.

The systems and methods described herein also provide resulting improvements to computing technology tasked with operation relative to the disclosed delivery systems and methods. For instance, the use of an autonomous robot such as that described herein can ultimately lead to improved delivery of packages and other deliverable items. By way of example, the autonomous robot according to embodiments of the present disclosure can travel into operational domains that may not be available to an autonomous vehicle, while also utilizing the autonomous vehicle to travel longer distances that may not be readily traversed by the autonomous robot. Accordingly, the speed and range of delivery and/or other item transportation services can be improved via the use of the autonomous robot of the present disclosure.

The systems and methods of the present disclosure also provide an improvement to autonomous computing technology, such as autonomous robot and vehicle computing technology. For instance, the autonomous robot of the present technology can interface with an autonomous vehicle to leverage the resources of the onboard vehicle systems, while also being able to travel independently from the autonomous vehicle. For example, the autonomous robot (e.g., a ground-travel based robot) can include a main body with one or more compartments that are configured to provide support for transporting an item and a mobility assembly (e.g., wheel assembly, track assembly, etc.) affixed to the main body. The autonomous robot can include sensor(s) configured to obtain sensor data associated with a surrounding environment of the autonomous robot and a computing system operable with the sensor for receiving the sensor data. The computing system can be configured to plan a motion of the autonomous robot based at least in part on the sensor data. The computing system can be operably connected to the mobility assembly for controlling a motion of the autonomous robot (e.g., by sending control signals to drive the mobility assembly). The autonomous robot can include a coupling assembly configured to temporarily secure the autonomous robot to an autonomous vehicle. Moreover, the autonomous robot can include systems that are configured to interface with the autonomous vehicle. For instance, the autonomous robot can include a power system operable with the at least one of the computing system or the mobility assembly of the autonomous robot (e.g., for providing power thereto). The power system can include a power interface for interfacing with the autonomous vehicle to obtain a power resource from the autonomous vehicle. The autonomous robot can include a ventilation system configured to provide ventilation for the autonomous robot and that includes a ventilation interface for interfacing with the autonomous vehicle. The autonomous robot can also include a communication system, climate management system, a drainage system, and/or other systems that are interface-able with corresponding systems of the autonomous vehicle. Accordingly, the infrastructure of the autonomous robot can allow the autonomous robot to interface with the autonomous vehicle to leverage the vehicle's resources (e.g., power, ventilation, bandwidth/connectivity, drainage, heating/cooling, etc.). This allows the autonomous robot to maintain a more limited onboard infrastructure. Moreover, the infrastructure allows for the autonomous vehicle to remain smaller in size so that it can be efficiently positioned within the autonomous vehicle without being an excessive payload for the autonomous vehicle and without unduly encroaching on the space of a passenger. Thus, the autonomous robot provides an efficient approach to item delivery and transportation without providing a burden to an autonomous vehicle and/or a passenger thereof.

With reference now to the FIGS., example embodiments of the present disclosure will be discussed in further detail.

FIG. 1 illustrates an example autonomous vehicle assembly 10 according to example embodiments of the present disclosure. The autonomous vehicle assembly 10 can include an autonomous vehicle 105 with a first computing system. The first computing system can be a vehicle computing system 100. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, etc. FIG. 2 depicts an example ground-based autonomous vehicle 200. With reference again to FIG. 1, the autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions for controlling an autonomous vehicle, such as those described herein.

The autonomous vehicle 105 can include a power system 110. The power system 110 can be configured to provide power from a power source to the systems of the autonomous vehicle 105. For instance, the autonomous vehicle 105 can include one or more power sources such as, for example, batteries (e.g., rechargeable batteries, non-rechargeable batteries, etc.), solar power devices (e.g., solar panels, etc.), fuel cell(s), and/or other power sources (e.g., fuel, combustion-based power, etc.). The power system 110 can be configured to control the power supplied from one or more of the power sources. For example, the power system 110 can include an electric circuit that can manage and deliver electric power (e.g., via one or more wired connections, bus, etc.) to the systems of the autonomous vehicle 105 (e.g., the sensors, positioning system, drive train, etc.). The power system 110 can be configured allocate the vehicle's power resources based on the various power requirements of the onboard systems.

The autonomous vehicle 105 can include a communication system 120 configured to allow the vehicle computing system 100 (and its computing device(s)) to communicate with other computing devices. The vehicle computing system 100 can use the communication system 120 to communicate with one or more computing device(s) that are remote from the autonomous vehicle 105 over one or more networks (e.g., via one or more wireless signal connections). For example, the communication system 120 can allow the autonomous vehicle to send and receive data from an operations computing system of a service entity. In some implementations, the communication system 120 can allow communication among one or more of the system(s) onboard the autonomous vehicle 105. The communication system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The autonomous vehicle 105 can include other sensors configured to acquire data associated with the autonomous vehicle 105. For example, the autonomous vehicle 105 can include inertial measurement unit(s), and/or other sensors.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can communicate (e.g., transmit, send, make available, etc.) the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the autonomous vehicle 105 according to the motion plan.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160 (and/or the motion planning system 165).

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the autonomous vehicle 105 (e.g., multiple times per second). Each new motion plan can describe a motion of the autonomous vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

The autonomous vehicle can include a ventilation system 185. The ventilation system 185 can include means for supplying air, exhausting air, recirculating air, purifying air, and/or other functions. The ventilation system 185 can include means configured to allow for air to flow throughout the autonomous vehicle 105. For example, the ventilation system 185 can include one or more airflow pathways (e.g., tubes, pipes, ducts, conduits, etc.) that can allow air to flow in and out of the cabin of the autonomous vehicle 105. The ventilation system 185 can include means for measuring one or more characteristics of the air. For example, the ventilation system can include one or more sensors that are configured to obtain data indicative of the air temperature, humidity, flow, purity, pressure, and/or other characteristics of the air within the autonomous vehicle 105. These sensor(s) can include, for example, a flowmeter, carbon dioxide ($CO_2$) sensor, oxygen ($O_2$) sensor, humidity sensor, pressure sensor, temperature sensor, and/or other types of sensors. The ventilation system 185 can include means for moving air and/or causing airflow. For example, the ventilation system 185 can include one or more fans configured to push or pull air in a particular direction. The ventilation system 185 can include means for air intake and/or extraction. For instance, the ventilation system 185 can include one or more air inlets/outlets (e.g., vents, etc.) that are configured to allow air to flow into the autonomous vehicle 105 (e.g., the interior cabin, etc.) and/or out of the autonomous vehicle (e.g., the interior cabin, etc.). The ventilation system 185 can include one or more means for purifying the air such as, for example, one or more filters. The ventilation system 185 can include one or more air inlets/outlets that are configured to allow air to flow out of the autonomous vehicle 105 into the surrounding environment and to allow air from the surrounding environment to flow into the autonomous vehicle 105. The ventilation system 185 can include a ventilation control circuit that is configured to control the flow of air into and out of the autonomous vehicle 105 (e.g., into and out of the cabin, etc.). The ventilation control circuit can be configured to control the flow of air based on data acquired from the sensor(s) of the ventilation system 185 and activate one or more of the fans to cause airflow accordingly. In some implementations, the ventilation control circuit can be configured to control the purity of the air by forcing airflow through one or more of the filters.

The autonomous vehicle 105 can include a climate management system 190. The climate management system 190 can include means for controlling the climate within the autonomous vehicle 105. For instance, the climate management system 190 can include a vehicle air conditioning and/or heating system that can control the temperature of the interior cabin of the autonomous vehicle 105. In some implementations, the climate management system 190 can control other conditions of the inside environment of the autonomous vehicle 105 (e.g., humidity, etc.). The climate management system 190 can include a climate control circuit that can communicate with other components of the climate management system 190 to control temperature. For instance, the climate control circuit can be communicatively coupled to one or more devices (e.g., fan(s), etc.) that are configured to force air across a cooling element (e.g., an evaporator core, coil, etc.) within a handler to provide cool air into the cabin of the autonomous vehicle 105. The cool air can be distributed via one or more air pathways, tubes, pipes, ducts, etc. and output from one or more vents. Additionally, or alternatively, heated air can be distributed in a similar manner with the air being forced across a heating element (e.g., coils, etc.).

The autonomous vehicle 105 can include a drainage system 195. The drainage system 195 can include means for draining fluid from onboard the autonomous vehicle 105. For example, the drainage system 195 can include a fluid inlet (e.g., drain inlet, pipe inlet, etc.) that can allow fluid to flow into a fluid pathway (e.g., tube, pipe, conduit, etc.). The drainage system 195 can include a pump and/or other similar such mechanism for forcing fluid through the fluid pathway our of a discharge outlet. In some implementations, the discharge outlet can lead the fluid to a tank onboard the autonomous vehicle 105. Additionally, or alternatively, the discharge outlet can lead the fluid out of the autonomous vehicle 105. In some implementations, the drainage system 195 can include a valve that is configured to control the flow of fluid within the fluid pathway. The drainage system 195 can include a drainage control circuit that is communicatively coupled to the pump and/or the valve to control the drainage of fluid.

In some implementations, the autonomous vehicle 105 can include a Human Machine Interface (not shown) that can output data for and accept input from a user of the autonomous vehicle 105. The HMI can include one or more output devices such as display devices, speakers, tactile devices, etc. For instance, the autonomous vehicle 105 can include a plurality of display devices. The display devices can include a display screen, CRT, LCD, plasma screen, touch screen, TV, projector, other types of display devices and/or a combination thereof. One or more of the display devices can be included in a user device (e.g., personal computer, tablet, mobile phone, etc.).

The plurality of display devices can include a first display device and a second display device. The first display device can be associated with the exterior of the autonomous vehicle 105. The first display device can be located on an exterior surface and/or other structure, of the autonomous vehicle 105 and/or configured such that a user can view and/or interact with the first display device (and/or a user interface rendered thereon) from the exterior of the autonomous vehicle. For example, one or more windows of the autonomous vehicle 105 can include smart glass technology that can perform as the first display device. The second display device can be associated with the interior of the autonomous vehicle 105. The second display device can be located on an interior surface and/or other structure (e.g., seat, etc.) of the autonomous vehicle 105 and/or configured such that a user can view and/or interact with the second display device (and/or a user interface rendered thereon) from the interior of the autonomous vehicle 105. For example, a user device (e.g., tablet, etc.) located within the interior of the autonomous vehicle 105 can include the second display device.

The autonomous vehicle 105 can be associated with a variety of different parties. In some implementations, the autonomous vehicle 105 can be associated with a vehicle provider. The vehicle provider can include, for example, an owner, a manufacturer, a vendor, a manager, a coordinator, a handler, etc. of the autonomous vehicle 105. The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system 100 of the autonomous vehicle 105. The vehicle provider computing system can include a server system (e.g., of an entity), a user device (e.g., of an individual owner), and/or other types of computing systems.

The autonomous vehicle 105 can be associated with a service entity. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

The autonomous vehicle 105 can be configured to perform vehicle services for one or more service entities. An autonomous vehicle 105 can perform a vehicle service by, for example and as further described herein, travelling (e.g., traveling autonomously) to a location associated with a requested vehicle service, allowing user(s) and/or item(s) to board or otherwise enter the autonomous vehicle 105, transporting the user(s) and/or item(s), allowing the user(s) and/or item(s) to deboard or otherwise exit the autonomous vehicle 105, etc. In this way, the autonomous vehicle 105 can provide the vehicle service(s) for a service entity to a user.

Each service entity can be associated with a respective telecommunications network system of that service entity. A telecommunications network system can include the infrastructure to facilitate communication between the autonomous vehicle 105 and the various computing systems of the associated service entity that are remote from the autonomous vehicle 105. For example, a service entity can utilize an operations computing system to communicate with, coordinate, manage, etc. autonomous vehicle(s) to perform the vehicle services of the service entity. A telecommunications network system can allow an autonomous vehicle 105 to utilize the back-end functionality of the respective operations computing system (e.g., vehicle service assignment allocation, vehicle technical support, etc.).

An operations computing system can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system, etc.), a user device, etc. The operations computing system can be or otherwise included in a data center for the service entity, for example. The operations computing system can be distributed across one or more location(s) and include one or more sub-systems. The computing device(s) of an operations computing system can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system (e.g., the one or more processors, etc.) to perform operations and functions, such as communicating data to and/or obtaining data from vehicle(s), robot(s), etc.

In some implementations, the operations computing system and the vehicle computing system 100 can indirectly communicate. For example, a vehicle provider computing system can serve as an intermediary between the operations computing system and the vehicle computing system 100 such that at least some data is communicated from the operations computing system (or the vehicle computing system 100) to the vehicle provider computing system and then to the vehicle computing system 100 (or the operations computing system).

An operations computing system can be configured to select and assign tasks to autonomous vehicles. For example, a user device of a user can communicate data indicative of a service request for a vehicle service to an operations computing system associated with a service entity.

The operations computing system can be configured to generate a vehicle service assignment. A vehicle service assignment can be indicative of a vehicle service (e.g., requested by a user via a user device) to be performed by a vehicle (e.g., an autonomous vehicle). A vehicle service assignment can include a variety of information associated with the vehicle service, the requesting user, the user device, the service entity, etc. For example, a vehicle service assignment can include data indicative of an associated user and/or user device (if permitted), data indicative of a compensation parameter (e.g., the compensation for delivering an item to a user, couriering an item for a user, transporting a user, etc.), data indicative of one or more locations (e.g., origin location, destination location, intermediate location, etc.), data indicative of a type of vehicle service (e.g., transportation service, delivery service, courier service, etc.), data indicative of the type of cargo for the vehicle service (e.g., passengers, luggage, packages, food, time-sensitive mail, etc.), data indicative of a vehicle type/size (e.g., sedan, sport utility vehicle, luxury vehicle, etc.), data indicative of one or more time constraints (e.g., pick-up times, drop-off times, time limits for delivery, service duration, etc.), data indicative of user preferences (e.g., music, temperature, etc.), data indicative of one or more vehicle service parameters (e.g., luggage types, handle-with-care instructions, special pick-up requests, etc.), data indicative of the vehicle capacity required/preferred for the vehicle service (e.g., the number of seats with seatbelts, an amount of trunk space, an amount of cabin space, etc.), data indicative of user ratings, data indicative of one or more vehicle service incentives (e.g., increased compensation, increased ratings, priority treatment, etc.), and/or other types of data.

The operations computing system can identity one or more autonomous vehicles that are available for a vehicle service assignment. For example, the operations computing system can select an autonomous vehicle that meets the preferences of the user, has the necessary capacity, is the requested vehicle type, etc. Additionally, or alternatively, the operations computing system can select an autonomous vehicle based at least in part on the current and/or future location of the autonomous vehicle. For example, the vehicle service coordination system can select an autonomous vehicle that is proximate to an origin location associated with the vehicle service assignment. Additionally, or alternatively, the vehicle service coordination system can select an autonomous vehicle that is within and/or nearby a geographic area that includes the origin location and/or destination location of the vehicle service assignment.

The operations computing system can communicate data indicative of a vehicle service assignment to the vehicle computing system 100 of the autonomous vehicle 105. Additionally, or alternatively, the vehicle computing system 100 can communicate data associated with the autonomous vehicle 105 to the operations computing system. In this way, the operations computing system can coordinate the performance of vehicle service(s) for user(s) by an autonomous vehicle 105 as well as monitor the autonomous vehicle 105. Similar such communications can take place with an autonomous robot to coordinate the performance of services by an autonomous robot (e.g., the delivery of item(s), etc.).

In some implementations, the operations computing system can communicate with one or more vehicle provider computing systems (associated with one or more vehicle providers). The operations computing system and one or a plurality of vehicle provider computing systems (e.g., of one or more vehicle providers, etc.) can communicate data to and/or from one another. For example, the operations computing system can communicate data indicative of a vehicle service assignment, and/or other data as described herein, to one or more vehicle provider computing system(s). The vehicle provider computing system(s) can then communicate such data to the vehicle computing system 100. Additionally, or alternatively, a vehicle provider computing system can communicate data associated with the autonomous vehicles 105 (and/or other data) to the operations computing system.

In addition to, or in the alternative to, transporting a user 210, an autonomous vehicle 105 can be configured to transport one or more autonomous robots 215. For instance, the autonomous vehicle 105 can transport an autonomous robot 215 concurrently with a user 210 (e.g., a human passenger) in order to pool its transportation services and, thus, decreasing the cost to the user 210. The autonomous robot 215 can be, for example, a ground-travel based autonomous robot, as shown, for example, in FIG. 3A.

Figure 5:
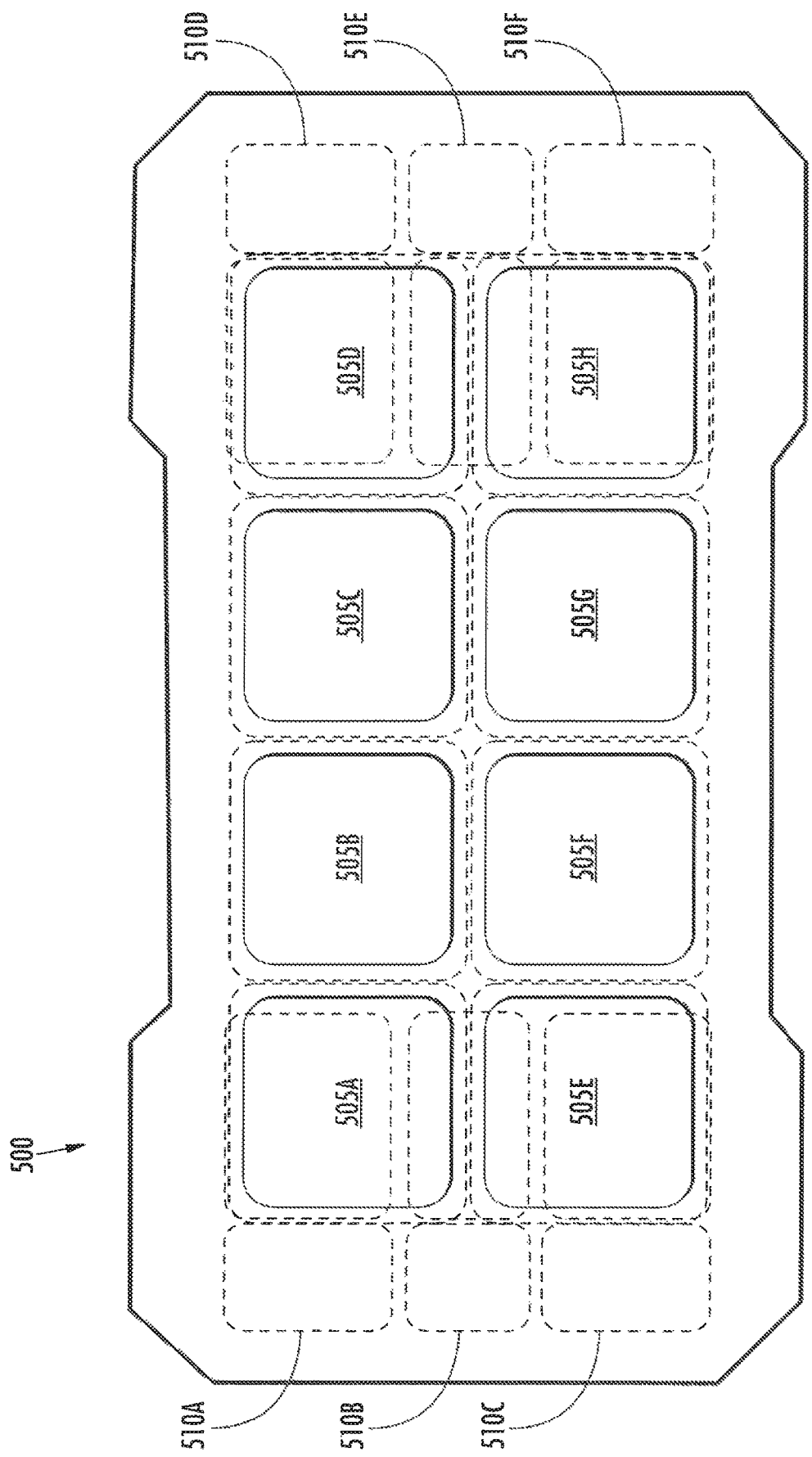
FIG. 5 depicts example positions within an autonomous vehicle according to example embodiments of the present disclosure.

In some implementations, the autonomous vehicle 105 can include one or more designated positions within the autonomous vehicle 105 for an autonomous robot 215. For example, FIG. 5 depicts example autonomous vehicle floor 500 with positions 505A-H within an autonomous vehicle 105 according to example embodiments of the present disclosure. The positions 505A-H can be indicative of designated positions that have been determined for an autonomous robot 215 to potentially be located within the interior cabin of the autonomous vehicle 105. A designated position 505A-H can include, for example, a designated area within a grid-like floor pattern, as shown in FIG. 5. The autonomous robot 215 can be positioned at one of these designated position(s) 505A-H when the autonomous robot 215 is onboard the autonomous vehicle 105, as further described herein.

In some implementations, the autonomous vehicle 105 can also include one or more passenger seating positions, such as seating positions 510A-F, which, when in use, may restrict the available positions 505A-H that can be used by an autonomous robot 215. For example, the seating positions 510A-F can be associated with one or more foldable seats (e.g., automatically adjustable steps) that can move between a storage position (e.g., which does not restrict the available positions 505A-H) to an extended seat position (e.g., which may restrict one or more available positions 505A-H), and/or vice versa.

Returning to FIG. 1, the autonomous robot 215 can be configured to perform one or more services. For example, the autonomous robot 215 can be utilized for transporting one or more items. The items can include, for example, food, electronics, toiletries, tools, construction materials, reading material, flowers, toys, medicine, perishable items, non-perishable items, personal effects, and/or any other items. The autonomous robot 215 can transport an item that is at least one of: an item that is available for purchase by a user 210 of the autonomous vehicle 105, an item that is available for rent by the user 210 of the autonomous vehicle 105, an item to be delivered based at least in part on a transportation of the autonomous robot 215 via the autonomous vehicle 105, and/or another type of item. An item that is available for purchase by a user 210 of the autonomous vehicle 105 can include an item that can be purchased by a passenger onboard the autonomous vehicle 105 before, during, and/or after transport. An item that is available for rent by the user 210 of the autonomous vehicle 105 can include an item that can be rented by a passenger onboard the autonomous vehicle 105 before, during, and/or after transport. An item to be delivered based at least in part on a transportation of the autonomous robot 215 via the autonomous vehicle 105 can include an item that is to be transported to a destination by the autonomous robot 215 based at least in part on the autonomous robot 215 riding onboard the autonomous vehicle 105 for at least some time to reach the destination location. Such an item can be available for rent or for purchase. In some implementations, an item can be ordered by a user 210 onboard the autonomous vehicle 105 (e.g., via a software application, etc.) and the autonomous robot 215 can board the autonomous vehicle 105 to deliver such an item.

The autonomous robot 215 can be associated with a variety of parties. For instance, in some implementations, an autonomous robot 215 can be associated with a service entity. This can be the service entity that is associated with the autonomous vehicle 105 (e.g., that is transporting a user 210). The service entity can allow a third party to use, lease, rent, etc. the autonomous robot 215 to transport items associated with the third party. In some implementations, the autonomous robot 215 can be associated with a user 210 of the autonomous vehicle 105 (e.g., a user that owns, rents, leases, etc. the autonomous robot 215). For example, the user 210 can utilize the autonomous robot 215 to transport items for the user 210 and/or delivery items to the user 210 while the user 210 is riding in the autonomous vehicle 105, to another location, etc. In some implementations, the autonomous robot 215 can be associated with a third party. The third party can include, for example, a retailer, a service provider, a shipper, and/or other types of entities. The third party can utilize the autonomous robot 215 to transport items, as described herein. In some implementations, the autonomous robot 215 can be associated with a vehicle provider.

The autonomous robot 215 can include an infrastructure that allows it to transport items, autonomously travel, and integrate with the system(s) of an autonomous vehicle 105. FIG. 3 depicts an example autonomous robot 215 according to example embodiments of the present disclosure. The autonomous robot 215 can include means for transporting an item. The autonomous robot 215 can include a main body 220 with a frame 225. The main body 220 can include one or more compartments 305A-C, as shown in FIG. 3B. Each of the compartments 305A-C can be configured to provide support for transporting one or more item(s) 310. The compartment(s) 305A-C can be different sizes, shapes, etc. and/or can be configured to transport different items 310. For example, a first compartment 305A can be configured to transport food and a second compartment 305B can be configured to transport medicine. One or more of the compartment(s) 305A-C can be physically separated from one another. In some implementations, the compartment(s) 305A-C can be thermally separated from one another such that the compartment(s) 305A-C can have different thermal conditions (e.g., temperature, humidity, etc.). In some implementations, the compartment(s) 305A-C can include a lock (e.g., mechanical lock, magnetic lock, electronic lock, etc.). The lock can be adjusted between a locked state and an unlocked state to secure items 310 while in transport and to allow for retrieval by an authorized user.

Figure 3A:
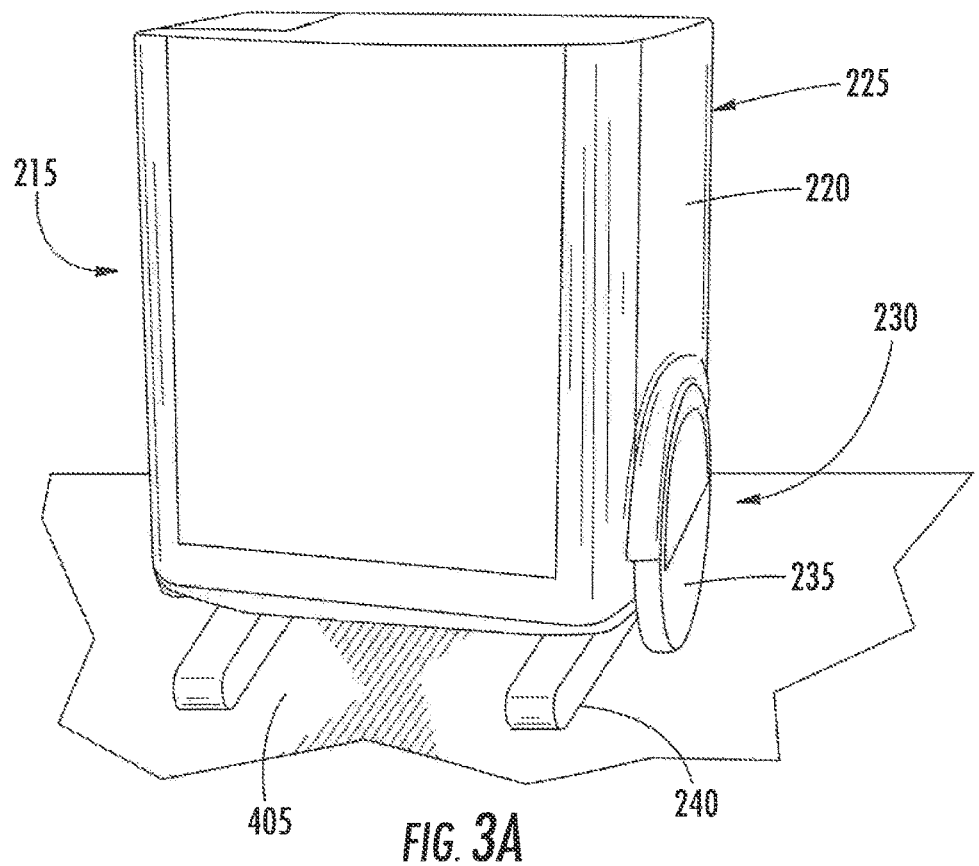
FIG. 3A depicts an example autonomous robot according to example embodiments of the present disclosure.
Figure 3B:
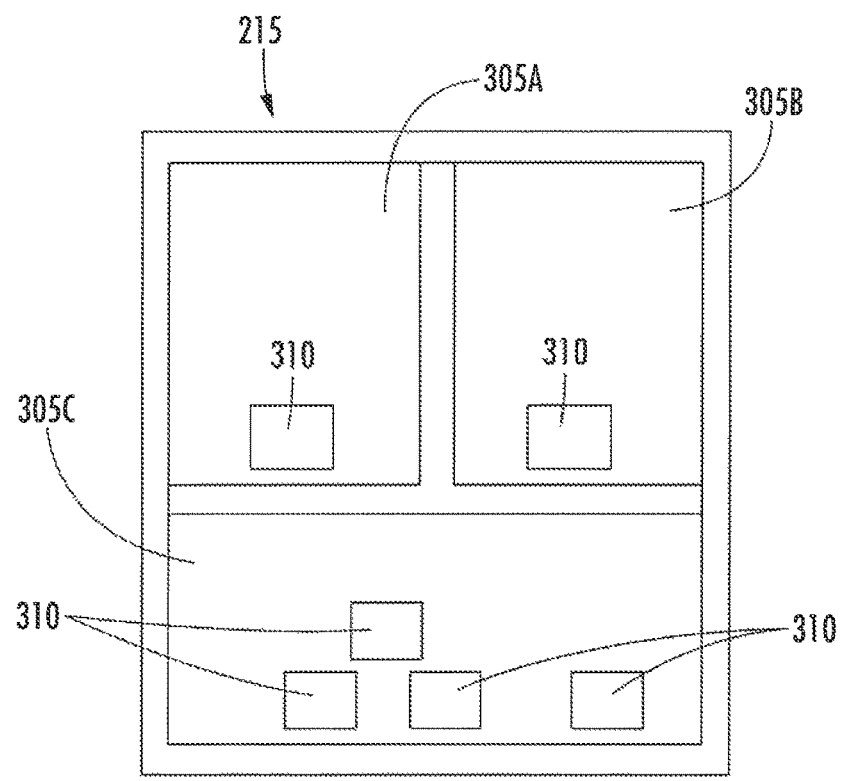
FIG. 3B depicts example interior compartments of an autonomous robot according to example embodiments of the present disclosure

With reference to FIG. 3A, the autonomous robot 215 can also include means for allowing the autonomous robot 215 to move along a ground surface, into an autonomous vehicle 105, etc. For instance, the autonomous robot 215 can include a mobility assembly 230 affixed to the main body 220. The mobile assembly 230 can include, for example, at least one of two or more wheels 235 (e.g., a self-balancing wheel assembly, etc.), a track assembly 240 (e.g., one or more tracks, etc.), and/or other mechanism(s) for allowing the autonomous robot 215 to traverse a surface. One or more portions of the mobility assembly 230 can be retractable. For example, as shown in FIGS. 4A-B, the track assembly 240 can be retracted into a stowed position toward the main body 220 of the autonomous robot 215. The track assembly 240 can be configured to not contact a surface 405 (e.g., ground surface, vehicle floor, vehicle ramp, etc.) while in the stowed position (e.g., as shown in FIGS. 4A-B). The track assembly 240 can be moved into an extended position away from the main body 220 of the autonomous robot 215. The track assembly 240 can be configured to contact a surface 405 (e.g., a ground surface, vehicle floor, vehicle ramp, etc.) while in the extended position (e.g., as shown in FIG. 3A). Additionally, or alternatively, the autonomous robot 215 (e.g., the mobility assembly 230) can include one or more balancing wheels 242. The balancing wheel(s) 242 can be configured to move from a stowed position (e.g., as shown in FIG. 4B) to an extended position. The balancing wheel(s) 242 can help balance the weight of the autonomous robot 215 as the autonomous robot 215 is traversing a surface (e.g., travelling up a ramp, step, etc. into the cabin of the autonomous vehicle 105, changing planes of travel surfaces, etc.).

The mobile assembly 230 can be connected to a powertrain and/or other type of drive mechanism that is configured help start, maintain, reduce, etc. the motion of the mobility assembly 230 (e.g., the wheels 235, track assembly 240, etc.).

Returning to FIG. 1, the autonomous robot 215 can include means for autonomously controlling the motion of the autonomous robot 215. For instance, the autonomous robot 215 can include one or more sensors 245, a robot computing system 250, and a positioning system 255.

The sensor(s) 245 can be configured to obtain sensor data 260 associated with a surrounding environment of the autonomous robot 215. The sensor(s) 245 can include, for example, cameras (e.g., mono cameras, infrared cameras, stereo cameras, etc.), Light Detection and Ranging (LIDAR) systems, Range Detection and Ranging (RADAR) systems, and/or other types of sensors. The sensor data 260 can include image data, LIDAR data, RADAR data, and/or other types of data. The sensor(s) 245 can be positioned on various portions of the autonomous robot 215. For example, as shown in FIG. 4A, a sensor 245 (e.g., a camera, etc.) can be affixed to the main body 220 of the autonomous robot 215 (e.g., to the frame 225).

With reference again to FIG. 1, the robot computing system 250 of the autonomous robot 215 can plan and control the operation of the autonomous robot 215. The robot computing system 250 can include one or more computing devices located onboard the autonomous robot 215. For example, the computing device(s) can be located on and/or within the autonomous robot 215. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous robot 215 (e.g., its computing system, one or more processors, etc.) to perform operations and functions for controlling an autonomous robot 215, such as those described herein.

The robot computing system 250 of the autonomous robot 215 can be operable with the sensor(s) 245 for obtaining the sensor data 260 (e.g., via a bus, etc.). The sensor data 269 can be communicated to the robot computing system 250, retrieved by the robot computing system 250, and/or otherwise made available to the robot computing system 250. The robot computing system 250 can be configured to plan a motion of the autonomous robot 215 based at least in part on the sensor data 260. For instance, the robot computing system 250 can include an autonomy system for perceiving objects in the surrounding environment (e.g., by analyzing the sensor data 260), predicting future locations and/or paths associated with such objects, and generating a motion plan that navigates through the surrounding environment based on map data as well as the predicted location of surrounding objects. This can be done in the same or a similar manner to that described herein with respect to the autonomous vehicle 105. Control signals can be outputted to control the motion of the autonomous robot 215 in accordance with the motion plan. For example, the robot computing system 250 can be operably connected to the mobility assembly 230 (a control system associated therewith) for controlling the motion of the autonomous robot 215 (e.g., to cause the wheels, tracks, etc. to move). Control signals can be communicated to the mobility assembly 230 (a control system associated therewith) to cause the autonomous robot 215 to initiate travel in accordance with at least a portion of a motion plan.

The positioning system 255 of the autonomous robot 215 can be configured to determine a specific location of the autonomous robot 215 relative to a geographic coordinate system, a specific target destination location, a location of an autonomous vehicle 105, and/or other locations. The positioning system 255 can determine actual or relative position by using a satellite navigation positioning system (e.g., a GPS system), an inertial navigation system, a dead reckoning system, based on IP address, by using triangulation and/or proximity to cellular towers or WiFi hotspots, and/or other suitable techniques for determining position. The positioning system 255 can allow the autonomous robot 215 to localize itself within its surrounding environment.

The autonomous robot 215 can include means for securing the autonomous robot 215 to the autonomous vehicle 105. For instance, the autonomous robot 215 can include a coupling assembly 265 configured to temporarily secure the autonomous robot 215 to an autonomous vehicle 105. The coupling assembly 265 can include one or more pins, locks, magnets, latches, hooks, and/or other mechanism(s) that can securely attach the autonomous robot 215 to the autonomous vehicle 105. This can help keep the autonomous robot 215 stationary while onboard the autonomous vehicle 105. In some implementations, the coupling assembly 265 can secure the autonomous robot 215 to one or more positions 505A-H of the autonomous vehicle 105 (e.g., shown in FIG. 5). In some implementations, the coupling assembly 265 can provide an interface (e.g., a wired data link, wireless connection interface, etc.) for transferring data and/or other resources between the autonomous robot 215 and the autonomous vehicle 105.

The autonomous robot 215 can include one or more systems that are configured to interface with the onboard system(s) of an autonomous vehicle 105. The autonomous robot 215 can include means for delivering power to the autonomous robot 215. For instance, the autonomous robot 215 can include a power system 270. The autonomous robot 215 can include one or more power sources such as, for example, batteries (e.g., rechargeable batteries, non-rechargeable batteries, etc.), solar power devices (e.g., solar panels, etc.), fuel cells, and/or other power sources (e.g., fuel, combustion-based power, etc.). For example, the power system 270 can include a battery positioned within the frame 225.

The power system 270 can be configured to control the power supplied from one or more of the power sources. The power system 270 can be configured allocate the robot's power resources based on the various power requirements of systems of the autonomous robot 215. The power system 270 can include a power control circuit that can manage and deliver power (e.g., via one or more wired connections, bus, etc.) to the systems of the autonomous robot 215. For example, the power system 270 can be operable with the at least one of the robot computing system 250 or the mobility assembly 230 (e.g., to provide power thereto).

The power system 270 can be configured to interface with the autonomous vehicle 105 to leverage the power resources of the autonomous vehicle 105, and/or vice versa. For instance, the power system 270 can include a power interface 280 (e.g., physical connector, cable, plug, prong(s), electrical pin(s), contact surface(s), connection-less/wireless energy transfer devices, piping, etc.) for interfacing with the autonomous vehicle 105 to create a unidirectional or a bi-directional connection that allows the autonomous robot 215 to obtain a power resource (e.g., electric charge, fuel, etc.) from the autonomous vehicle 105 and/or to allows the autonomous vehicle 105 to obtain a power resource from the autonomous robot 215. The autonomous robot 215 (e.g., the robot computing system 250) can control the power interface 280 to connect to the autonomous vehicle 105 such that electric power, fuel, etc. can be transferred from the autonomous vehicle 105 to the autonomous robot 215 or from the autonomous robot 215 to the autonomous vehicle 105. The autonomous robot 215 and/or the autonomous vehicle 105 can control the transfer of the power resources between the autonomous robot 215 and the autonomous vehicle 105. In some implementations, the autonomous vehicle 105 can include a power interface. The autonomous vehicle 105 can control its power interface to connection the autonomous vehicle to the autonomous robot 215 such that electric power, fuel, etc. can be transferred from the autonomous robot 215 to the autonomous vehicle 105. This can be done with one or more autonomous robot(s) 215. The autonomous vehicle 105 can obtain a power resource from an autonomous robot 215 while the autonomous vehicle 105 is in transit, online with a service entity, in real-time, away from a service depot, stationary (e.g., parked), etc.

The autonomous robot 215 can include a ventilation system 285 configured to provide ventilation for the autonomous robot 215. The ventilation system 285 can include means configured to allow for air to flow throughout the autonomous robot 215 and/or its one or more compartments 305A-C. For example, the ventilation system 285 can include one or more airflow pathways (e.g., tube, pipes, ducts, conduit, etc.), one or more sensors (e.g., flowmeter, CO2 sensor, O2 sensor, humidity sensor, pressure sensor, temperature sensor, etc.), means for moving air and/or causing airflow (e.g., fans, etc.), one or more inlets/outlets (e.g., vents, etc.) that are configured to allow air to flow into the autonomous robot 215 (e.g., the compartments 305A-C, etc.) and/or out of the autonomous robot 215 (e.g., the compartments 305A-C, etc.), means for purifying air (e.g., filter(s), etc.). The ventilation system 285 can include a ventilation control circuit that is configured to control the flow of air into, within, and/or out of the autonomous robot 215 (e.g., into and out of the compartments 305A-C, etc.). The ventilation control circuit can be configured to control the flow of air based on data acquired from the sensors of the ventilation system 285 and activate one or more of the fans to cause airflow accordingly. In some implementations, the ventilation control circuit can be configured to control the purity of the air by forcing airflow through one or more of the filters.

The ventilation system 285 can include a ventilation interface 290 (e.g., connection tube, pipe, and/or other fluid pathway) for interfacing with the autonomous vehicle 105 (e.g., the ventilation system 185 of the autonomous vehicle 105). The ventilation interface 290 can include a fluid pathway such as, for example, a connection tube, pipe, duct, conduit, etc. The autonomous robot 215 (e.g., the robot computing system 250) can control the ventilation interface 290 to connect to the autonomous vehicle 105 such that air (and/or another gas) can flow from the autonomous robot 215 to the autonomous vehicle 105, or vice versa. For example, the autonomous robot 215 may utilize the ventilation interface 290 to connect to the autonomous vehicle 105 such that the autonomous robot 215 can exhaust air (and/or another gas) through the vehicle's ducts out into the environment surrounding the autonomous vehicle 105. The autonomous robot 215 and/or the autonomous vehicle 105 can control the ventilation between the autonomous robot 215 and the autonomous vehicle 105 (e.g., the direction, rate, etc. of airflow).

The autonomous robot 215 can include a climate management system 295 that is configured to control one or more climate conditions (e.g., temperature, humidity, etc.) of the one or more compartments 305A-C of the main body 220. The climate management system 295 can include means for controlling the climate condition. For instance, the climate management system 295 can include a cooling and/or heating system that can control the temperature of the compartments 305A-C. The climate management system 295 can include a climate control circuit that can communicate with other components of the climate management system 295 to control the climate conditions.

The climate management system 295 can include a climate management interface 315 (e.g., electrical connection, fluid pathway, etc.) for interfacing with the climate management system 190 of the autonomous vehicle 105 (e.g., to draw from the vehicle's heating/cooling resources, vice versa). The autonomous robot 215 (e.g., the robot computing system 250) can control the climate management interface 315 to connect to the autonomous vehicle 105 such the autonomous robot 215 can utilize the cooling resources of the autonomous vehicle 105 (e.g., accept cool air, exhaust hot air, etc.) and/or utilize the heating resources of the autonomous vehicle 105 (e.g., accept hot air, exhaust cool air, etc.). The autonomous robot 215 and/or the autonomous vehicle 105 can control the cooling/heating exchange between the autonomous robot 215 and the autonomous vehicle 105 (e.g., the direction, rate, etc.).

In some implementations, the autonomous robot 215 can include a drainage system 320 configured to provide drainage for a fluid from the autonomous robot 215. Similar to the autonomous vehicle 105, the drainage system 320 can include means for draining fluid from onboard the autonomous robot 215. For example, the drainage system 320 can include a fluid inlet (e.g., drain inlet, pipe inlet, etc.) that can allow fluid to flow into a fluid pathway (e.g., tube, pipe, conduit, etc.), a pump and/or other similar such mechanism for forcing fluid through the fluid pathway, and a discharge outlet for discharging the fluid (e.g., into a tank, out of the autonomous robot 215, etc.). In some implementations, the drainage system 320 can include a valve that is configured to control the flow of fluid within the fluid pathway. The drainage system 195 can include a drainage control circuit that is communicatively coupled to control the drainage of fluid associated with the autonomous robot 215.

The drainage system can include a drainage interface 325 (e.g., tube, pipe, other fluid pathway, etc.) for interfacing with a drainage system 195 of the autonomous vehicle 105. The autonomous robot 215 (e.g., the robot computing system 250) can control the drainage interface 325 to connect to the autonomous vehicle 105 such the autonomous robot 215 can utilize the drainage system 320 of the autonomous vehicle 105. For example, once autonomous robot 215 is connected to the autonomous vehicle 105, the autonomous robot 215 can cause a fluid to drain from the autonomous robot 215 to the autonomous vehicle 105. The autonomous vehicle 105 can be configured to drain the fluid into a tank onboard the autonomous vehicle 105 and/or out of the autonomous vehicle 105. The autonomous robot 215 and/or the autonomous vehicle 105 can control the drainage exchange between the autonomous robot 215 and the autonomous vehicle 105.

The autonomous robot 215 can include a communication system 330 configured to communicate and obtain data across one or more networks. For example, the communication system 330 can allow the autonomous robot 215 to communicate and obtain data from the autonomous vehicle 105, a user device, another remote computing system (e.g., an operations computing system), etc. In some implementations, the communication system 330 can allow communication among one or more of the system(s) on-board the autonomous robot 215. The communication system 330 can include any suitable components for interfacing with one or more network(s), including, for example, transmitters, receivers, ports, controllers, antennas, and/or other suitable components that can help facilitate communication.

The communication system 330 can include a communication interface (e.g., physical connector, cable, transmitter, receiver, antenna, etc.) for interfacing (e.g., physically and/or wirelessly) with the communication system 120 of the autonomous vehicle 105. This can allow the autonomous robot 215 to leverage the onboard communication system 120 of the autonomous vehicle 105 (which may be more robust) to better communicate data, obtain data (e.g., map updates, etc.), and/or perform other communication function(s).

While the example embodiments of the present disclosure describe an autonomous robot 215 with interfaces for connecting with an autonomous vehicle 105, this is not meant to be limiting. The autonomous vehicle 105 can include one or more similar such interfaces (e.g., power interface, climate management interface, drainage interface, communication, interface, ventilation interface, etc.) for leveraging the system(s) of the autonomous robot 215 and the resources of the autonomous robot 215 (e.g., power, computing, etc. resources).

In some implementations, the autonomous robot 215 can include an identification system 340. The identification system 340 can include, for example, transmitters, receivers, transmitters, receivers, ports, controllers, antennas, and/or other suitable components for providing radio-frequency identification (RFID) signals, Bluetooth signals, and/or other types of identification data/data packets. The identification system 340 can allow the autonomous robot 215 to identify itself with respect to another computing system (e.g., the vehicle computing system 100, etc.) before, while, and/or after boarding the autonomous vehicle 105. For instance, the identification system 340 can be configured to provide an identifier associated with the autonomous robot 215 (e.g., to the autonomous vehicle 105). This can allow the autonomous vehicle 105 recognize the autonomous robot 215 and/or authorize the autonomous robot 215 to board the autonomous vehicle 105, couple to the autonomous vehicle 105, and/or interface one or more systems with the autonomous vehicle 105. In some implementations, the autonomous robot 215 can include a visual identifier (e.g., QR code, barcode, etc.) on the autonomous robot 215 (e.g., on the exterior of the main body). This can allow the autonomous robot 215 to be scanned (e.g., via a sensor of the autonomous vehicle 105) to authenticate the autonomous robot 215. In some implementations, the autonomous robot 215 can obtain data indicative of an identifier associated with the autonomous vehicle 105 to determine that the autonomous vehicle 105 is the correct vehicle for boarding.

Figure 6:
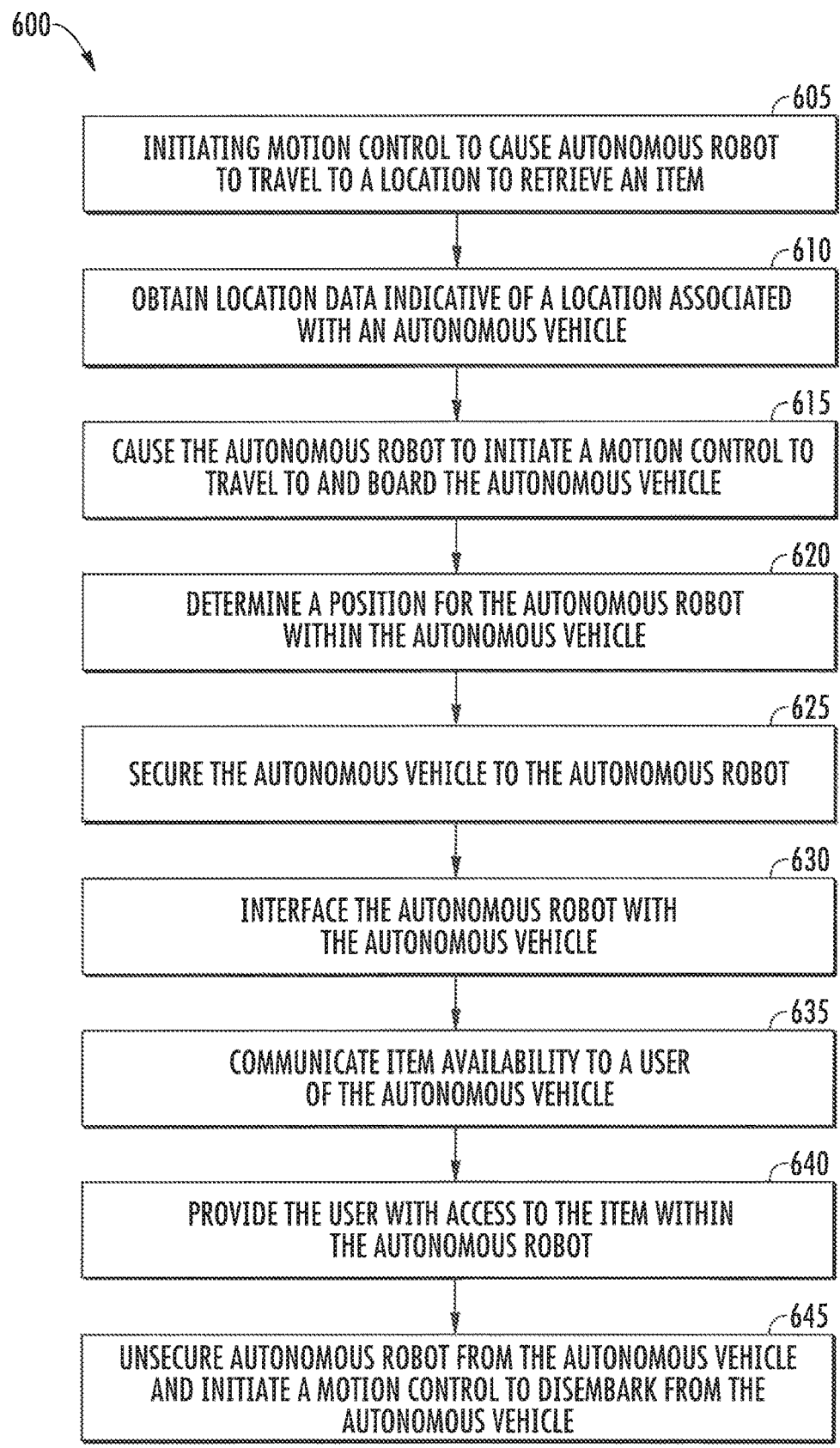
FIG. 6 depicts a flow diagram of an example method for operating and controlling an autonomous robot according to example embodiments of the present disclosure.

FIG. 6 depicts a flow diagram of an example method 600 for controlling an autonomous robot 215 according to example embodiments of the present disclosure. One or more portion(s) of the method 600 can be implemented by a computing system including one or more computing devices such as, for example, the computing systems described with reference to the other figures (e.g., a robot computing system 250 of an autonomous robot 215, operations computing system, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-4B, 8, and/or 9), for example, to control an autonomous robot 215. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for example illustrated purposes and is not meant to be limiting. One or more portions of method 600 can be performed additionally, or alternatively, by other systems.

At (605), the method 600 can include initiating a motion control to cause the autonomous robot to travel to a location to retrieve an item. For instance, an autonomous robot 215 can be a ground-based robot. A computing system (e.g., the robot computing system 250 of the autonomous robot 215, a remote computing system (e.g., operations computing system), another computing system) can cause the autonomous robot 215 to initiate a motion control to travel to a location for the retrieval of an item 310.

Figure 7:
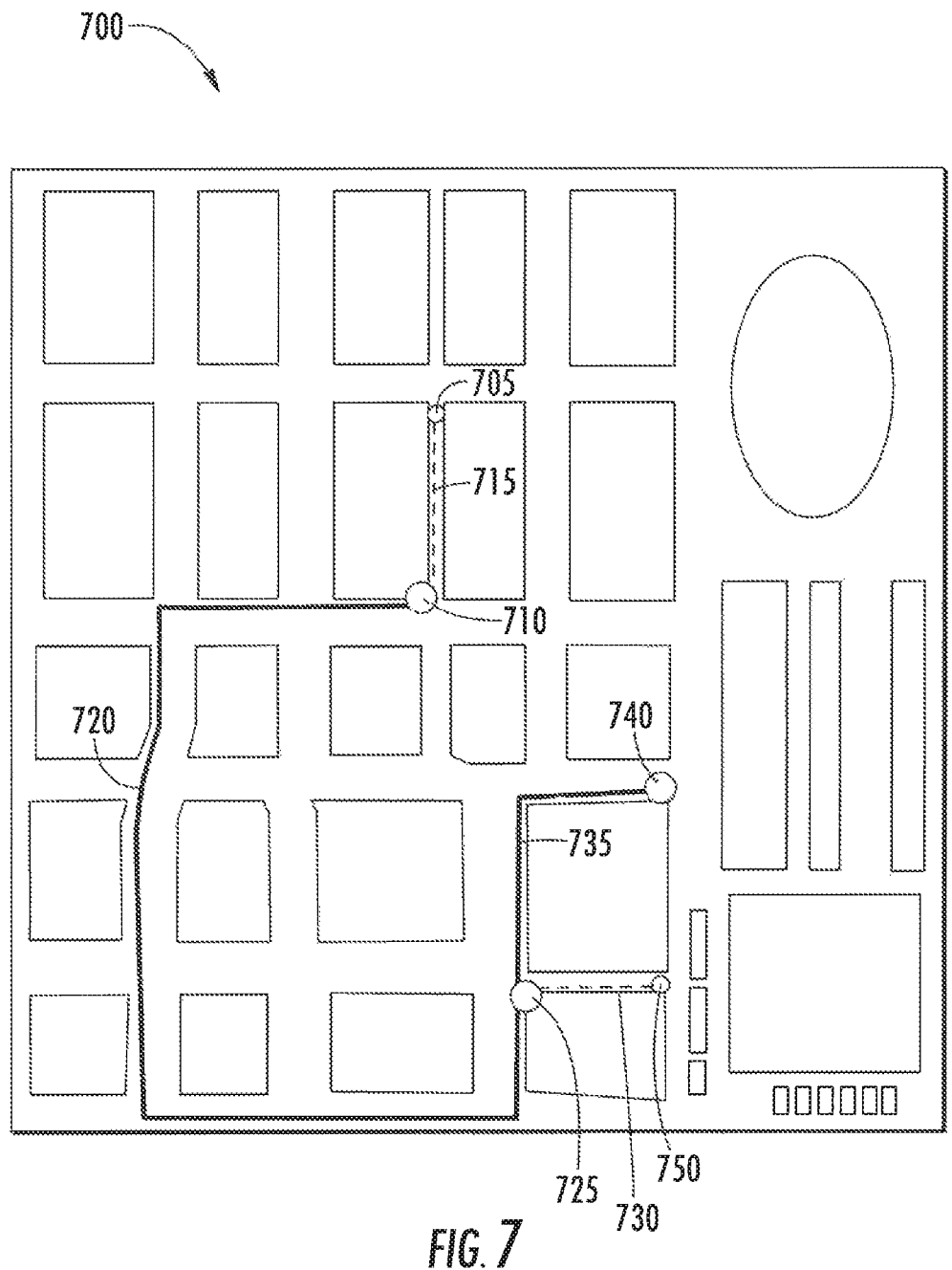
FIG. 7 depicts an example geographic area according to example embodiments of the present disclosure.

By way of example, FIG. 7 depicts an example geographic area 700 according to example embodiments of the present disclosure. The computing system (e.g., the robot computing system 250 of the autonomous robot 215, etc.) can obtain data indicative of a retrieval location 705. The retrieval location 705 can include, for example, a location associated with a third party such as a retailer, shipper, merchandiser, pharmacy, warehouse, etc. In the event that the autonomous robot 215 is not already located at the retrieval location, the autonomous robot 215 can autonomously navigate to the retrieval location. For instance, the robot computing system 250 can cause the autonomous robot 215 to initiate a motion control in accordance with at least a portion of a motion plan generated for navigating the autonomous robot 215 through its surrounding environment to the retrieval location 705. The motion control can be an operation, action, etc. that is associated with controlling the motion of the autonomous robot 215. For instance, the motion plan can be provided to a control system that is associated with the mobility assembly 230. In some implementations, the control system can be associated with a controller (e.g., including an interface) that is configured to implement the motion plan. The vehicle controller can, for example, translate the motion plan into instructions for the mobility assembly's execution. By way of example, the controller can translate a determined motion plan into instructions to adjust the direction of travel of the autonomous robot 215, adjust the speed and/or acceleration of the autonomous robot 215, etc. The computing system can send one or more control signals such that the mobility assembly 230 initiates travel to the retrieval location 705. At the retrieval location 705, one or more items 310 can be loaded into the autonomous robot 215 (e.g., one or more of the compartments 305A-C, etc.).

At (610), the method 600 can include obtaining location data indicative of a location associated with an autonomous vehicle. For instance, the computing system (e.g., the robot computing system 250 of the autonomous robot 215, etc.) can obtain location data indicative of a location associated with an autonomous vehicle 105. The location data can be obtained from a memory onboard the autonomous robot 215, a remote computing system (e.g., an operations computing system, etc.), the computing system 100 of the autonomous vehicle 105, and/or another system. The location associated with the autonomous vehicle 105 can be a current location of the autonomous vehicle 105, a future location of the autonomous vehicle 105, and/or a predetermined location at which the autonomous robot 215 can meet the autonomous vehicle 105.

By way of example, with reference to FIG. 7, the computing system can obtain location data indicative of a location 710 associated with an autonomous vehicle 105. The location 710 can include, for example, a designated robot pick-up location within the geographic area 700 (and/or a sub-region thereof). Additionally, or alternatively, the location 710 associated with the autonomous vehicle 105 can include a future location of the autonomous vehicle 105. The future location can include a location at which an autonomous vehicle 105 is to pick-up a user 210 (e.g., an origin location associated with a user), a location that can be determined based on the location of the autonomous robot 215 and/or the retrieval location 705, and/or another type of estimated future location. In some implementations, the location 710 can be a current location of an autonomous vehicle 105 (e.g., where the vehicle is parked, etc.).

Returning to FIG. 6, at (615), the method 600 can include causing the autonomous robot to initiate a motion control to travel to and board an autonomous vehicle. For instance, the computing system can cause the autonomous robot 215 to initiate a motion control to travel to the location 710 of the autonomous vehicle 105 based at least in part on the location data (e.g., indicative of the location 710) and to board the autonomous vehicle 105. The computing system can send one or more signals to cause the mobility assembly to initiate motion such that the autonomous robot 215 autonomously travels to the location 710 associated with the autonomous vehicle 105 (e.g., along the robot path 715 shown in FIG. 7).

The autonomous robot 215 can board the autonomous vehicle 105 at and/or near the location 710 associated with the autonomous vehicle 105. For instance, the autonomous vehicle 105 can be a ground-based vehicle. The computing system (e.g., of the autonomous robot 215) can cause the autonomous robot 215 to board the autonomous vehicle 105. By way of example, the control system associated with the mobility assembly 230 can cause the track assembly 240 to move into an extended position such that the autonomous robot 215 can traverse a ramp, stairs, and/or other entry way into the interior cabin of the autonomous vehicle 105.

For example, with reference to FIG. 2, an autonomous vehicle 200 can include a ramp 205. The ramp 205 can provide a pathway by which the autonomous robot 215 (and/or a user 21) can enter and/or exit the autonomous vehicle 200 (e.g., an interior cabin). The ramp 205 can include an extendable tongue portion (e.g., a telescoping tongue, etc.) that can extend away from and retract into the ramp 205. This can allow the ramp 205 to more easily accommodate various curbs, surfaces, etc. when allowing a user 210 and/or autonomous robot 215 to board the autonomous vehicle 200. As described herein, the autonomous vehicle 105 can be the autonomous vehicle 200 shown in FIG. 2.

Figure 8:
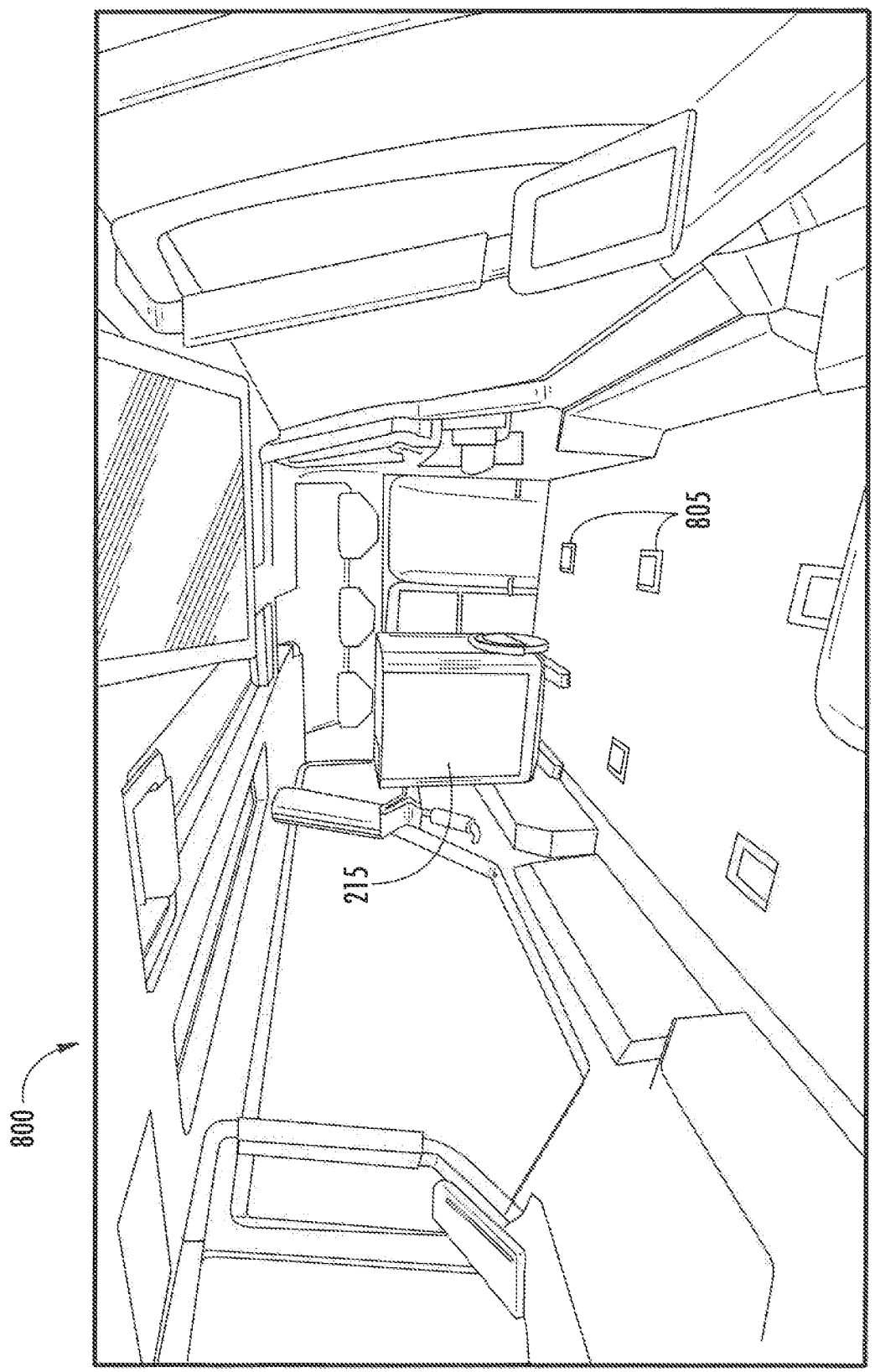
FIG. 8 depicts an example interior cabin of an autonomous vehicle according to example embodiments of the present disclosure.

At (620), the method 600 can include determining a position for the autonomous robot within the autonomous vehicle. For instance, the computing system can determine a position within the autonomous vehicle 105 for the autonomous robot 215. In some implementations, the computing system can determine the position of the autonomous robot 215 based on one or more cabin identifiers. For example, FIG. 8 depicts an example interior cabin 800 of an autonomous vehicle 105 according to example embodiments of the present disclosure. The interior cabin 800 of the autonomous vehicle 105 (e.g., the floor, walls, ceiling, etc.) can include one or more cabin identifiers 805 (e.g., lights, reflective surfaces, markings, etc.) that indicate where the autonomous robot 215 may position itself within the autonomous vehicle 105. The sensor(s) 245 of the autonomous robot 215 can obtain sensor data 260 indicative of these cabin identifiers. The computing system (e.g., the robot's onboard robot computing system 250) can determine a position within the autonomous vehicle 105 (e.g., within the cabin 800) based at least in part on the cabin identifiers. The determined position can be, for example, a position 505A-H within a grid-like floor pattern as shown, for example, in FIG. 5. The computing system can autonomously navigate the autonomous robot 215 to the determined position within the autonomous vehicle 105 (e.g., a position that provides a user 210 with sufficient space within the cabin 800).

Additionally, or alternatively, the computing system (e.g., the robot computing system 250 of the autonomous robot 215) can obtain, from a remote computing system (e.g., from the computing system 100 of the autonomous vehicle 105, operations computing system, etc.), positional data indicative of a position 505A-H within the autonomous vehicle 105. The computing system can determine the position for the autonomous robot 215 within the autonomous vehicle 105 based at least in part on this positional data. As described herein, in some implementations, the autonomous vehicle 105 can include one or more designated positions within the autonomous vehicle 105 for the autonomous robot 215 and the autonomous robot 215 can be positioned at one of the designated positions. For example, the autonomous vehicle 105 can include a grid-like floor pattern (as shown in FIG. 5). The floor pattern can have an associated reference frame. The positional data can provide, for example, coordinate(s) associated with a position within the reference frame. A set of coordinates can be indicative of the positions 505A-C within the grid-like floor pattern. The computing system can utilize these coordinates (and the reference frame) to determine where the autonomous robot 215 should be positioned within the cabin 800 of the autonomous vehicle 105. The computing system can control the autonomous robot 215 travel to the designated position 505A-H within the autonomous vehicle 105.

In some implementations, the autonomous vehicle 105 can be configured to indicate to a user where an autonomous robot 215 may travel within the cabin 800 to avoid potential obstruction. For instance, the cabin 800 of the autonomous vehicle 105 can indicate where an autonomous robot 215 may travel within the cabin 800 and/or be positioned. For example, the cabin floor can include an indicator (e.g., light, projected text, etc.) that indicates a user 210 is not to block a certain portion of the cabin (e.g., a position 505A-H). The autonomous vehicle 105 (e.g., the computing system 100) can determine which indicator(s) should be presented based on the positional data. The autonomous vehicle 105 (e.g., the computing system 100) can communicate signal(s) to cause these indicators to be presented within the cabin 800 (e.g., to illuminate lights, project information, etc.). This can ensure that the autonomous robot 215 is not obstructed as it boards the autonomous vehicle 105 and travels to the determined position within the autonomous vehicle 105.

At (625), the method can include securing the autonomous robot to the autonomous vehicle. For instance, the computing system can control a coupling assembly 265 of the autonomous robot 215 to secure the autonomous robot 215 to the autonomous vehicle 105 at the position within the autonomous vehicle 105. For instance, the computing system can send signal(s) to a control system associated with the coupling assembly 265 to cause the coupling assembly to temporarily couple the autonomous robot 215 to the autonomous vehicle 105 (e.g., via the robot's pins, magnets, lock, latch, etc.) at the determined position within the cabin 800 of the autonomous vehicle 105.

In some implementations, the autonomous robot 215 can utilize one or more of the sensor(s) 245 (e.g., hi-resolution cameras, etc.) to determine and guide the coupling assembly 265 and/or the autonomous robot 215 such that the coupling assembly 265 and/or the autonomous robot 215 are correctly positioned to secure the autonomous robot 215 to the autonomous vehicle 105. The position of the coupling assembly 265 and/or autonomous robot 215 can be adjusted to correctly align the coupling assembly 265 and/or the autonomous robot 215 (e.g., via the mobility assembly 230). In some implementations, the sensor(s) 125 of the autonomous vehicle 105 can be utilized for such purpose. In this way, the autonomous robot 215 and/or autonomous vehicle 105 can include a visual proximity detection function that will help determine that the autonomous robot 215 (and/or the coupling assembly 265) is correctly positioned based at least in part on sensor data (e.g., camera image data) and allow for the autonomous robot 215 (and/or the coupling assembly 265) to be adjusted based at least in part on the sensor data (e.g., via the mobility assembly 230), if needed.

At (630), the method 600 can include interfacing the autonomous robot with the autonomous vehicle. For instance, the computing system (e.g., robot computing system 250, etc.) can control the autonomous robot 215 to connect one or more systems of the autonomous robot 215 to the autonomous vehicle 105. For instance, the autonomous vehicle 105 can include a first power system 110 including a first power source for the autonomous vehicle 105. The autonomous vehicle 105 can include a first ventilation system 185 configured to provide ventilation for the autonomous vehicle 105. The autonomous robot 215 can include a second power system 270 that can be connected to the autonomous vehicle 105 (when the autonomous robot 215 is onboard the autonomous vehicle 105) to obtain a power resource from the first power system 110 of the autonomous vehicle 105, or vice versa. The autonomous robot 215 can include a second ventilation system 285 that is configured to provide ventilation for the autonomous robot 215. The second ventilation system 285 is connected with the first ventilation system 185 of the autonomous vehicle 105. The computing system can send signal(s) to cause the power interface 280 and/or the ventilation interface 290 of the autonomous robot 215 to be adjusted (e.g., extended, positioned, moved, etc.) and to connect with the autonomous vehicle 105 (e.g., the respective first power system 110, first ventilation system 185, etc.). The computing system can also cause one or more of the other systems of the autonomous robot 215 (e.g., the communication system 330, the drainage system 320, the climate management system 315, etc.) to connect to the autonomous vehicle 105 via their respective interfaces.

At (635), the method 600 can include communicating item availability to a user of the autonomous vehicle. For instance, the computing system can indicate to a user 210 of the autonomous vehicle 105 that one or more items 310 within the autonomous robot 215 are available (e.g., for rent, purchase, etc.). For example, the autonomous vehicle 105 can include a user 210 (e.g., passenger). The user 210 (e.g., passenger) can be associated with a service request for transporting the user 210 (e.g., passenger). The autonomous vehicle 105 can be assigned to transport the user 210 (e.g., passenger). The user 210 (e.g., passenger), and the autonomous robot 215 can be located in a cabin 800 of the autonomous vehicle 105 at the same time. As described herein, the autonomous robot 215 can include compartment(s) 305A-C and item(s) 310 (e.g., snacks, drinks, tools, electronics, etc.) can reside within the compartment(s) 305A-C. The computing system (e.g., the robot computing system 250 of the autonomous robot 215) can communicate a message to a user device of a user 210 of the autonomous vehicle 105 and/or to a user device associated with the autonomous vehicle 105 (e.g., an onboard tablet within the cabin, etc.). The message can indicate that the item(s) 310 are available for the user 210. Additionally, or alternatively, the autonomous robot 215 can include one or more output devices (e.g., speakers, display screens, tickers, etc.). The computing system can provide data indicative of the availability of the item 310 for presentation via the output device(s). This can include an audible output, a visual output (e.g., via a display device), etc. indicating the availability of the item(s) 310.

At (640), the method 600 can include providing the user with access to the item within the autonomous vehicle. For instance, while the autonomous robot 215 is onboard the autonomous vehicle 105, the computing system can provide a user 210 access to the item(s) 310 within the autonomous robot 215. For instance, in the event that the user 210 (e.g., passenger) desires to obtain any of the item(s) (e.g., purchase an electronic device, etc.), the computing system can send signal(s) to unlock, open, etc. one or more compartments 305A-C of the autonomous robot 215. The autonomous robot 215 can allow the user 210 access to one or more of the compartment(s) 305A-C to remove the item 310. The user 210 can, for example, complete the transaction via communication with the autonomous robot 215 (e.g., by sending a purchase communication to the autonomous robot 215) and/or via a software application associated with the service entity of the autonomous vehicle 105.

At (645), the method 600 can include decoupling the autonomous robot from the autonomous vehicle and initiating a motion control to disembark from the autonomous vehicle. For instance, the computing system can control the autonomous robot 215 to decouple from the autonomous vehicle 105 and to disembark from the autonomous vehicle 105. By way of example, with reference to FIG. 7, the autonomous vehicle 105 can travel (e.g., along vehicle path 720) with the user 210 and the autonomous robot 215 concurrently riding onboard the autonomous vehicle 105 (e.g., within the interior cabin 800). As the autonomous vehicle 105 approaches and/or when the autonomous vehicle reaches a first destination location 725 associated with the autonomous robot 215 (e.g., a robot drop-off location), the computing system can provide signal(s) to the coupling assembly 265 of the autonomous robot 215 (e.g., the pins, magnets, locks, latches, etc.) to detach, disengage, etc. from the autonomous vehicle 105. Moreover, the computing system can initiate a motion control to cause the autonomous robot 215 to leave the autonomous vehicle 105. For example, the autonomous robot 215 can disembark from the autonomous vehicle 105 (e.g., via the doors of the cabin 800). If needed, the computing system can cause the autonomous robot 215 to autonomously travel to another location 750 (e.g., a delivery location for the delivery of item(s) 310, another retrieval location, etc.). The autonomous robot 215 can travel via path 730 outside of the autonomous vehicle 105. The autonomous vehicle 105 can travel (e.g., via path 735) to a second destination location 740 associated with the user 210 (e.g., to drop-off the user 210). In some implementations, the autonomous vehicle 105 can travel to the second destination location 740 before the first destination location 725 (e.g., to drop-off the user 210 before the autonomous robot 215). In some implementations, the autonomous vehicle 105 may drop-off both the user 210 at the second location 740 and the autonomous robot 215 can disembark from the autonomous vehicle 105 at the second location 740. The autonomous robot 215 can travel from the second location 740 to another location 750 (e.g., a delivery location for the delivery of item(s) 310, another retrieval location, etc.).

Figure 9:
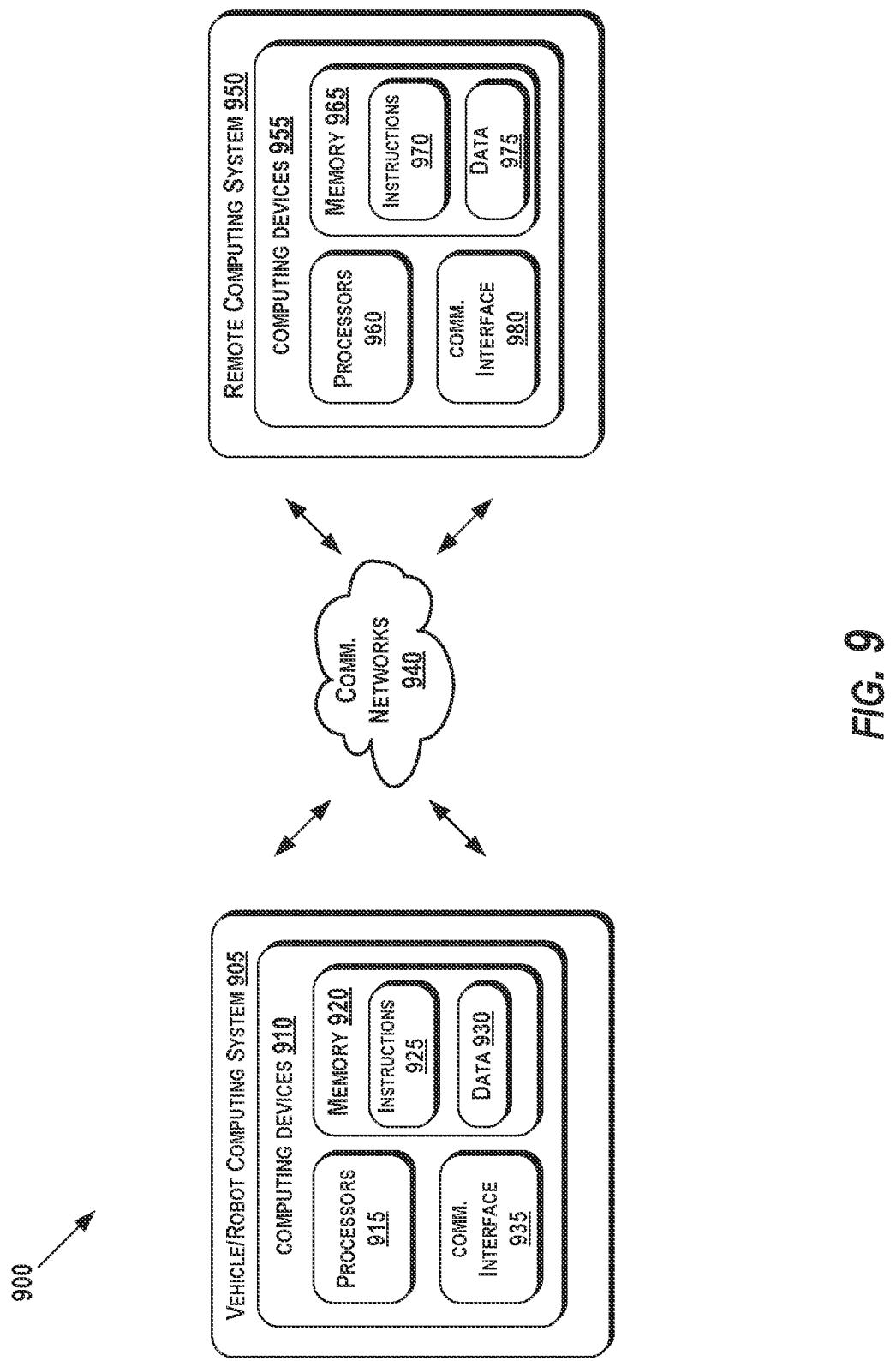
FIG. 9 depicts example system components according to example embodiments of the present disclosure.

FIG. 9 depicts an example system 900 according to example embodiments of the present disclosure. The example system 900 illustrated in FIG. 9 is provided as an example only. The components, systems, connections, and/or other aspects illustrated in FIG. 9 are optional and are provided as examples of what is possible, but not required, to implement the present disclosure. The example system 900 can include a computing system 905. The computing system 905 can represent/correspond to the vehicle computing system 100 and/or the robot computing system 250 of the autonomous robot 215. The example system 900 can include a remote computing system 950 (e.g., that is remote from the computing system 905). The remote computing system 950 can represent/correspond to an operations computing system described herein and/or another computing system that is located remotely from the autonomous robot 215 and/or the autonomous vehicle 105. The computing system 905 and the remote computing system 950 can be communicatively coupled to one another over one or more network(s) 940.

The computing device(s) 910 of the computing system 905 can include processor(s) 915 and memory 920. The one or more processors 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, data registrar, etc., and combinations thereof.

The memory 920 can store information that can be accessed by the one or more processors 915. For instance, the memory 920 (e.g., one or more non-transitory computer-readable storage mediums, memory devices) on-board the vehicle/robot can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 (the computing system 905) to perform operations such as any of the operations and functions of the vehicle computing system 100 (or for which it is configured), any of the operations and functions of the robot computing system 250, one or more of the operations and functions of the other systems described herein, one or more of the operations and functions for controlling an autonomous vehicle 105 and/or autonomous robot 215, one or more portions of method 600, and/or one or more of the other operations and functions of the computing systems described herein.

The memory 920 can store data 930 that can be obtained (e.g., acquired, received, retrieved, accessed, created, stored, etc.). The data 930 can include, for instance, sensor data, map data, perception data, prediction data, motion planning data, data associated with a service entity, data associated with an API, data associated with a library, data associated with library parameters, data associated with service assignments, data associated with locations (e.g., origin locations, destination locations, retrieval locations, delivery locations, pick-up locations, etc.), data associated with item(s), data indicative of message(s) for users, data associated with user interfaces, data associated with hardware interfaces, identification data, and/or other data/information such as, for example, that described herein. In some implementations, the computing device(s) 910 can obtain data from one or more memories that are remote from the computing system 905.

The computing device(s) 910 can also include a communication interface 935 used to communicate with one or more other system(s) on-board a vehicle/robot and/or a remote computing device that is remote from the vehicle/robot (e.g., of the system 950). The communication interface 935 can include any circuits, components, software, etc. for communicating via one or more networks (e.g., network(s) 940). The communication interface 935 can include, for example, one or more of a communications controller, receiver, transceiver, transmitter, port, conductors, software and/or hardware for communicating data.

The remote computing system 950 can include one or more computing device(s) 955 that are remote from the vehicle computing system 905. The computing device(s) 955 can include one or more processors 960 and a memory 965. The one or more processors 960 can be any suitable processing device (e.g., a processor core, a microprocessor, an ASIC, a FPGA, a controller, a microcontroller, etc.) and can be one processor or a plurality of processors that are operatively connected. The memory 965 can include one or more tangible, non-transitory computer-readable storage media, such as RAM, ROM, EEPROM, EPROM, one or more memory devices, flash memory devices, data registrar, etc., and combinations thereof.

The memory 965 can store information that can be accessed by the one or more processors 960. For instance, the memory 965 (e.g., one or more tangible, non-transitory computer-readable storage media, one or more memory devices, etc.) can include computer-readable instructions 970 that can be executed by the one or more processors 960. The instructions 970 can be software written in any suitable programming language or can be implemented in hardware. Additionally, or alternatively, the instructions 970 can be executed in logically and/or virtually separate threads on processor(s) 960.

For example, the memory 965 can store instructions 970 that when executed by the one or more processors 960 cause the one or more processors 960 to perform operations such as any of the operations and functions of the operations computing systems described herein, one or more of the operations and functions of the robot computing system 250 of the autonomous robot 215, one or more of the operations and functions of vehicle computing system 100, one or more operations and functions for controlling an autonomous robot and/or autonomous vehicle, one or more portions of method 600, and/or one or more of the other operations and functions described herein.

The memory 965 can store data 975 that can be obtained. The data 975 can include, for instance, data associated with service requests, communications associated with/provided by vehicles/robots, data to be communicated to vehicles/robots, application programming interface data, data associated with vehicles/robots, data associated with locations, map data, data associated with item(s), data associated with user interfaces, data associated with user input, data associated with vehicle service assignments, data associated with acceptances and/or rejections of vehicle service assignments, data associated with different service entities, data associated with fleet(s) of vehicles/robots, and/or other data/information such as, for example, that described herein.

The computing device(s) 955 can also include a communication interface 980 used to communicate with one or more system(s) onboard a vehicle and/or another computing device that is remote from the system 950. The communication interface 980 can include any circuits, components, software, etc. for communicating via one or more networks (e.g., network(s) 940). The communication interface 980 can include, for example, one or more of a communications controller, receiver, transceiver, transmitter, port, conductors, software and/or hardware for communicating data.

The network(s) 940 can be any type of network or combination of networks that allows for communication between devices. In some embodiments, the network(s) 940 can include one or more of a local area network, wide area network, the Internet, secure network, cellular network, mesh network, peer-to-peer communication link and/or some combination thereof and can include any number of wired or wireless links. Communication over the network(s) 940 can be accomplished, for instance, via a communication interface using any type of protocol, protection scheme, encoding, format, packaging, etc.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
   determining that an autonomous vehicle has reached a location associated with an autonomous robot along a vehicle route, wherein the autonomous robot is transported with the autonomous vehicle while traveling along the vehicle route;
   controlling the autonomous robot to decouple from the autonomous vehicle in response to the determining that the autonomous vehicle has reached the location associated with the autonomous robot; and
   initiating a motion control to cause the autonomous robot to leave the autonomous vehicle and to travel to another location separate from the autonomous vehicle.

2. The computer-implemented method of claim 1, further comprising:
   providing, by a display device of the autonomous robot, a visual output indicative of a message.

3. The computer-implemented method of claim 1, further comprising:
   providing, by a speaker of the autonomous robot, an audio output indicative of a message.

4. The computer-implemented method of claim 1, further comprising:
   coupling the autonomous robot to the autonomous vehicle while the autonomous vehicle is in transit.

5. The computer-implemented method of claim 4, wherein coupling the autonomous robot to the autonomous vehicle while the autonomous vehicle is in transit comprises:
   determining a position for the autonomous robot relative to the autonomous vehicle; and
   controlling a coupling assembly of the autonomous robot to temporarily secure the autonomous robot to the autonomous vehicle at the position for the autonomous robot.

6. The computer-implemented method of claim 5, wherein the position for the autonomous robot relative to the autonomous vehicle is within the interior cabin of the autonomous vehicle.

7. The computer-implemented method of claim 5, wherein the controlling the coupling assembly of the autonomous robot to temporarily secure the autonomous robot to the autonomous vehicle comprises:
   guiding at least one of the coupling assembly or the autonomous robot to confirm the autonomous robot and coupling assembly are positioned to temporarily secure the autonomous robot to the autonomous vehicle, wherein the guiding is based at least in part on a visual proximity detection function.

8. The computer-implemented method of claim 1, wherein the other location separate from the autonomous vehicle comprises an operational domain that is not available to the autonomous vehicle.

9. The computer-implemented method of claim 1, wherein the autonomous vehicle is a truck.

10. An autonomous robot comprising:
    a main body;
    a mobility assembly coupled to the main body;
    a sensor configured to obtain sensor data associated with a surrounding environment of the autonomous robot;
    a computing system operable with the sensor for obtaining the sensor data, the computing system configured to plan a motion of the autonomous robot based at least in part on the sensor data, the computing system further operably connected to the mobility assembly for controlling a motion of the autonomous robot; and a coupling assembly configured to temporarily secure the autonomous robot to an autonomous vehicle, wherein the computing system sends control signals to the coupling assembly that cause the autonomous robot to be decoupled from the autonomous vehicle after determining that the autonomous vehicle has reached a disembarking location associated with the autonomous robot.

11. The autonomous robot of claim 10, wherein the computing system is further configured to initiate a motion control to cause the autonomous robot to leave the autonomous vehicle after determining that the autonomous vehicle has reached the disembarking location associated with the autonomous robot.

12. The autonomous robot of claim 11, wherein the computing system is further configured to cause the autonomous robot to initiate motion control to travel to another location that is separate from the autonomous vehicle.

13. The autonomous robot of claim 10, further comprising a display device configured to provide a visual output indicative of a message.

14. The autonomous robot of claim 10, further comprising one or more speakers configured to provide an audio output indicative of a message.

15. The autonomous robot of claim 10, wherein the coupling assembly is further configured to temporarily secure the autonomous robot to the autonomous vehicle at a position of the autonomous robot within the autonomous vehicle, wherein the position is determined in response to the computing system receiving at least one of positional data or sensor data indicative of one or more identifiers.

16. The autonomous vehicle of claim 10, wherein at least one of the autonomous vehicle or the autonomous robot is a ground-based vehicle.

17. An autonomous vehicle assembly comprising:
an autonomous vehicle comprising:
one or more first sensors configured to obtain first sensor data associated with a surrounding environment of the autonomous vehicle; and
a first computing system operable with the one or more first sensors for receiving the first sensor data, the first computing system configured to plan a motion of the autonomous vehicle along a vehicle route; and
an autonomous robot positioned onboard the autonomous vehicle while in transit along the vehicle route, the autonomous robot comprising:
a main body;
a mobility assembly affixed to the main body,
one or more second sensors configured to obtain second sensor data associated with a surrounding environment of the autonomous robot,
a second computing system operable with the one or more second sensors for receiving the second sensor data, the second computing system configured to plan a motion of the autonomous robot based at least in part on the second sensor data, the second computing system further operably connected to the mobility assembly for controlling a motion of the autonomous robot, and
a coupling assembly configured to temporarily secure the autonomous robot to the autonomous vehicle, wherein the first computing system sends control signals to the coupling assembly that cause the autonomous robot to be decoupled from the autonomous vehicle after determining that the autonomous vehicle has reached a location associated with the autonomous robot along the vehicle route.

18. The autonomous vehicle assembly of claim 17, wherein at least one of the first computing system and the second computing system is further configured to initiate a motion control to cause the autonomous robot to leave the autonomous vehicle after determining that the autonomous vehicle has reached the location associated with the autonomous robot along the vehicle route.

19. The autonomous vehicle assembly of claim 17, wherein at least one of the first computing system or the second computing system is further configured to cause the autonomous robot to initiate motion control to travel to another location that is separate from the autonomous vehicle.

20. The autonomous vehicle assembly of claim 17, the autonomous robot further comprising one or more output devices configured to provide an output indicative of a message.

* * * * *